United States Patent [19]

Scanlon

[11] Patent Number: 5,850,480
[45] Date of Patent: Dec. 15, 1998

[54] OCR ERROR CORRECTION METHODS AND APPARATUS UTILIZING CONTEXTUAL COMPARISON

[75] Inventor: Edward Francis Scanlon, Enfield, Conn.

[73] Assignee: Scan-Optics, Inc., East Hartford, Conn.

[21] Appl. No.: 656,417

[22] Filed: May 30, 1996

[51] Int. Cl.$^6$ .............................. G06K 9/72; G06K 9/00
[52] U.S. Cl. ........................ 382/229; 382/187; 382/230
[58] Field of Search ..................... 382/159, 161, 382/184, 187, 230, 231, 310, 309, 229; 707/500, 530

[56] References Cited

U.S. PATENT DOCUMENTS

| | | | |
|---|---|---|---|
| 4,309,569 | 1/1982 | Merkle | 178/22.08 |
| 4,979,227 | 12/1990 | Mittelbach et al. | 382/161 |
| 5,029,223 | 7/1991 | Fujisaki | 382/187 |
| 5,075,896 | 12/1991 | Wilcox et al. | 382/225 |
| 5,119,437 | 6/1992 | Kuwamura et al. | 382/229 |
| 5,133,023 | 7/1992 | Bokser | 382/161 |
| 5,392,363 | 2/1995 | Fujisaki et al. | 382/229 |
| 5,426,711 | 6/1995 | Kitamura | 382/187 |
| 5,519,786 | 5/1996 | Courtney et al. | 382/159 |
| 5,642,435 | 6/1997 | Loris | 382/229 |

*Primary Examiner*—Bipin Shalwala
*Attorney, Agent, or Firm*—Alix, Yale & Ristas, LLP

[57] ABSTRACT

The present invention includes methods of correcting optical character recognition errors occurring during recognition of alphanumeric character strings contained within one or more predetermined types of alphanumeric character fields. The methods may be practiced with a document processing system having (1) a optical character recognition device for scanning documents and outputting bit-map image data; (2) a recognition engine for converting the bit-map image data into possibly correct alphanumeric characters with associated confidence values; and (3) at least one lexicon of character strings consisting of a list of at least a portion of all of the possible character string values for each of the fields being processed. The present invention corrects OCR errors by performing a contextual comparison analysis between the alphanumeric characters outputted from the recognition engine and the lexicon of character strings. A number of preferred embodiments, and several examples of the type of information which can be processed by those embodiments, are disclosed.

31 Claims, 24 Drawing Sheets

Fig. 1

| Hand-written Simple Field Data | Raw OCR | Selected Lexicon Chair Strings | Distance Values |
|---|---|---|---|
| Shelia | SHZLIG | *SHELIA* | 1.201 |
| Creech | CIEECH | *CREECH* | 0.485 |
| Ruby | KBUY | *RUBY* | 1.284 |
| Jordan | JOUDAN | *JORDAN* | 1.214 |
| Tracy | TRGVY | *TRACY* | 1.413 |
| Richard | RICHCIL | *RICHARD* | 1.794 |
| Kendra | KVNJRA | *KENDRA* | 1.854 |
| McKittrick | MCKLGHRICK | *MCKITTRICK* | 2.543 |
| Grace | GRAVT | *GRACE* | 0.794 |
| Lackey | LQCKRY | *LACKEY* | 2.346 |
| AJ-ERIK | AJTERLK | *AMBERLY* | 3.963 |
| VIRGENE | VLRCTNE | *VINCENT* | 2.715 |

Fig. 2

| Hand-Written Data In Composite Field — 410 | Raw OCR — 420 | Selected Lexicon Character Strings — 430 |
|---|---|---|
| 677 ROBINS NEST CT | 677 ROBINS NISTCJ | 677 ROBINS NEST CT |
| 105 RITA-BLANCA | LDSRITFBLANCA | 105 RITABLANCA |
| HC 1 BOX 164 | HC L BOX L64 | HC 1 BOX 164 |
| 518 S. Mill Street | SL8 5 MILI SIRRCT | 518 S MILL STREET |
| 401 7th Avenue NW | 4OL NTH AVENVC NV | 401 7TH AVENUE NW |
| RT #7 BOX 230 | RT47 BOX 23O | RTE7 BOX 230 |
| RT 1 BOX 986 | RT L BOX Q86 | RT 1 BOX 916 |
| 1312 CHERT PIT RD | T3L2 CHERT PLT RD | 1512 THIRD CR RD |

← 1200 let $L_1, L_2, \ldots L_n$ (where $1 < n < 5$) = low range string character in nth position
let $H_1, H_2, \ldots H_m$ (where $1 < m < 5$) = high range string character in mth position
$P.C._j$ = phantom character in jth position (1,1) $L_1 \leq PC_1 \leq H_1$.

(1,2; if $H_2 = 9$ or $H_2$ is even and $= 8$)
    $L_1 \leq PC_1 \leq 9$; or
    $1 \leq PC_1 \leq H_1$ and $0 \leq PC_2 \leq 9$.

(1,2; otherwise)
    $L_1 \leq PC_1 \leq 9$; or
    $1 \leq PC_1 \leq H_1 - 1$ and $0 \leq PC_2 \leq 9$; or
    $PC_1 = H_1$ and $0 \leq PC_2 \leq H_2$.

(1,3) $L_1 \leq PC_1 \leq 9$; or
    $1 \leq PC_1 \leq 9$ and $0 \leq PC_2 \leq 9$; or
    $1 \leq PC_1 \leq H_1 - 1$ and $0 \leq PC_2 \leq 9$ and $0 \leq PC_3 \leq 9$; or
    $PC_1 = H_1$ and $0 \leq PC_2 \leq H_2 - 1$ and $0 \leq PC_3 \leq 9$; or
    $PC_1 = H_1$ and $PC_2 = H_2$ and $0 \leq PC_3 \leq H_3$.

(1,4) $L_1 \leq PC_1 \leq 9$; or
    $1 \leq PC_1 \leq 9$ and $0 \leq PC_2 \leq 9$; or
    $1 \leq PC_1 \leq 9$ and $0 \leq PC_2 \leq 9$ and $0 \leq PC_3 \leq 9$; or
    $1 \leq PC_1 \leq H_1 - 1$ and $0 \leq PC_2 \leq 9$ and $0 \leq PC_3 \leq 9$ and $0 \leq PC_4 \leq 9$; or
    $PC_1 = H_1$ and $0 \leq PC_2 \leq H_2 - 1$ and $0 \leq PC_3 \leq 9$ and $0 \leq PC_4 \leq 9$; or
    $PC_1 = H_1$ and $PC_2 = H_2$ and $0 \leq PC_3 \leq H_3 - 1$ and $0 \leq PC_4 \leq 9$; or
    $PC_1 = H_1$ and $PC_2 = H_2$ and $PC_3 = H_3$ and $0 \leq PC_4 \leq H_4$.

(3,4) $PC_1 = L_1$ and $PC_2 = L_2$ and $L_3 \leq PC_3 \leq 9$; or
    $PC_1 = L_1$ and $L_2 + 1 = PC_2 \leq 9$ and $0 \leq PC_3 \leq 9$; or
    $L_1 + 1 \leq PC_1 \leq 9$ and $0 \leq PC_2 \leq 9$ and $0 \leq PC_3 \leq 9$; or
    $1 \leq PC_1 \leq H_1 - 1$ and $0 \leq PC_2 \leq 9$ and $0 \leq PC_3 \leq 9$ and $0 \leq PC_4 \leq 9$; or
    $PC_1 = H_1$ and $0 \leq PC_2 \leq H_2 - 1$ and $0 \leq PC_3 \leq 9$ and $0 \leq PC_4 \leq 9$; or
    $PC_1 = H_1$ and $PC_2 = H_2$ and $0 \leq PC_3 \leq H_3 - 1$ and $0 \leq PC_4 \leq 9$; or
    $PC_1 = H_1$ and $PC_2 = H_2$ and $PC_3 = H_3$ and $0 \leq PC_4 \leq H_4$.

Fig. 8

OCR ERROR CORRECTION METHODS AND APPARATUS UTILIZING CONTEXTUAL COMPARISON

BACKGROUND OF THE INVENTION

1. Field of the Invention

The present invention relates to the field of document processors employing optical character recognition (OCR) devices for scanning documents. More specifically, the invention is directed to methods and apparatus for correcting processing errors occurring during OCR of alphanumeric data contained in predetermined types of data fields based on a contextual analysis of the OCR read results. Accordingly, the general objects of the present invention are to provide novel and improved methods and apparatus of such character.

2. Description of the Related Art

Document processing systems employing optical character recognition devices for scanning and storing the contents of documents are well known in the art. In a typical document processing system of this nature, documents are fed into a transport scanning device which serially scans each document, stores the data and passes the document to other devices for further processing. The scanned image of each document is then converted into a bit-map, i.e., digitized image data, of the entire document. The bit-mapped image data is then transmitted to a character recognition engine where the image data is analyzed in an attempt to convert various portions of the image data into discrete alphanumeric characters through character recognition. If the data is successfully recognized as one or more alphanumeric characters, it is transformed into discrete alphanumeric characters for storage and future processing. For example, data thus converted into the alphanumeric characters can be stored in a conventional computer database for future access and/or electronic processing without the need to further physically handle the original documents.

Document processors employing OCR devices have been utilized to facilitate processing of pre-formatted business forms with some degree of success. For example, such processors are currently used to read information printed on checks, income tax returns, mail-order catalog forms and a variety of other forms having a pre-determined format for user-entry of information. Automated scanning and processing of such forms is advantageous because these field-of-use applications often share two qualities: (1) a staggering number of forms must be routinely processed; and (2) the type of information contained on these forms can generally be contained within one or more discrete fields. The combination of these qualities offer the potential for reaping huge increases in efficiency by automating the previously slow, labor-intensive and costly procedure of manually processing the information contained on these forms. However, while the use of such document processors has long offered the potential for significantly reducing costly manual information processing, in practice, OCR document processors have only enjoyed limited application because they are prone to yield inaccurate results. Restated, the full benefits of wholly automated information processing have heretofore been significantly limited by the ability of OCR based document processors to accurately recognize the data contained on the above-mentioned forms.

In particular, the OCR art has continued to struggle with the problem of automated recognition of handwritten data and data printed in conventional fonts. Accurate recognition of handwriting has proven to be a particularly illusive goal due to the unconstrained nature of handwriting and the large variety of handwriting styles. Thus, character recognition errors continue to severely limit the utility of document processors employing optical character recognition devices where the information to be processed has been handwritten on documents.

These character recognition errors can be classified into two broad classes of errors. Errors of the first class, known as confusion errors, occur when the document processor cannot recognize one or more characters at all. Since confusion errors can be easily detected and signalled by the recognition device, they can usually be corrected before a database for storing recognized information is corrupted with incorrect data. However, once an error is detected, correction of that confusion error requires human operator intervention to manually key in the correct data. Errors of the second class, known as substitution errors, occur when a given character being analyzed is incorrectly identified as another character(s). Substitution errors include (1) incorrect identification of a single character as a different character; (2) incorrect identification of a single character as multiple characters; and (3) incorrect identification of multiple characters as a single character. Because the recognition device always yields some data when a substitution error occurs, substitution errors tend to be more difficult to detect than confusion errors. Hence, correction of these errors poses another unwieldy problem. Here again, resort has heretofore been made to human intervention to solve the problem.

Previous attempts to improve the accuracy and efficiency of OCR read results have taken a number of different approaches. These attempts have included (1) developing methods of ensuring the document processor correctly locates the targeted information on each document being processed; (2) providing document processors capable of detecting the location of information directly from a document; (3) developing methods of filtering out background format information from a document; and (4) utilizing machine-print fonts better suited for OCR than ordinary fonts. These efforts have resulted in somewhat more rapid and more reliable scanning and recognition of some printed information, e.g., machine print in special fonts.

A noteworthy characteristic of the above-listed previous attempts to improve the accuracy of optical character recognition results is that they have tended to focus on methods and apparatus for improving the accuracy of data presented at the output of a recognition engine. Thus, they have not attempted to solve such errors subsequent to outputting of the selected characters from the recognition engine. For example, many of these attempts have tended to focus on improving statistical analysis techniques for converting the raw bit-map image data of a given data field into one or more characters. These apparatus and techniques have only been marginally successful in minimizing confusion and substitution errors and they have only been successful at all in limited contexts. For example, while these systems have been utilized for highly constrained fields, e.g., the numeric amount field of a bank check, they are altogether inadequate for processing more complex alphanumeric data fields such as complete street address lines. Because more complex fields contain an intermixture of numbers, upper and lower case letters and special characters, sole use of OCR devices and techniques of the type described above produce an intolerably high number of substitution and confusion errors. Of course, this problem is compounded as field complexity further increases. For example, accurate scanning and recognition of a complete handwritten personal address, (i.e., first and last names, street address, state and a zip code), is believed to be well beyond the capability of the above-described devices and techniques.

Limited attempts have been made within the art to apply additional processing to the character data outputted from a recognition engine. However, these attempts have only been modest in scope and only marginally successful due to a number of deficiencies. For example, one system which uses an OCR device to scan address information from documents merely uses the address information to reference and output a nine-digit zip code. In this system error correction is not even attempted, only further processing. Additionally, while this prior art system performs its limited task by manipulating the output of a conventional recognition engine, it is not sophisticated enough to perform reliably when the information scanned from a document is hand-print (as opposed to machine-print).

Thus, there exists a need in the art for OCR error correction methods and apparatus capable of enhancing the accuracy of optical character recognition of machine-print and hand-print contained within a wide variety of specified alphanumeric field types.

SUMMARY OF THE INVENTION

The present invention satisfies the above needs, and overcomes the above-stated and other deficiencies of the prior art, by providing methods of correcting OCR errors occurring during recognition of alphanumeric character strings contained within one or more predetermined types of alphanumeric character fields. The present invention achieves this result by performing a contextual comparison between the raw OCR data outputted from the recognition engine and a lexicon of character strings containing at least a portion of all possible alphanumeric character strings for a given field type.

The present invention is preferably practiced with a document processing system having (1) an optical character recognition device for scanning documents and outputting bit-map image data; (2) a recognition engine for converting the bit-map image data into possibly correct alphanumeric characters (hereinafter "phantom characters") with associated confidence values for at least some character positions of each field; and (3) at least one lexicon of character strings (hereinafter "lexicon strings") consisting of a list of at least a substantial percentage of all of the possible character string values for each of the fields being processed.

The present invention is particularly well suited for use with document processors designed to process standardized forms having discrete character fields in predetermined locations of a document. On such a document each field consists of one or more discrete blocks in which a user can type or handwrite the desired information. While a wide variety of types of information can be included in a given field, each field should contain the type of information which allows at least a substantial portion of all of the possible values to be listed in a lexicon. These include, but are not limited to, first and last names, street addresses, cities, states, zip codes, social security and telephone numbers, occupations, titles, company or firm names, personal relationships, and nationalities. Thus, by using the present invention, information contained on complex forms containing many fields can be rapidly and accurately extracted and automatically processed by a document processor. The information can then be stored in a format which is readily understandable by a computer and subsequently used for various purposes such as automatically generating completed form letters for mass mailings.

One class of methods of correcting OCR errors in accordance with the present invention operates on a single data field (generally referred to as a simple field) at a time. This class of embodiments receives a single phantom character data table of OCR read results from the recognition engine of a conventional document processor. This phantom character data table consists of a set of related pairs of values (hereinafter "cognate pairs") where each cognate pair consists of a possibly accurately recognized alphanumeric character (i.e., a phantom character), and an associated confidence value. The number of positions of the data table is the number of characters which the recognition engine has detected during scanning of the document. Thus, if one or more substitution or confusion errors have occurred, the number of character positions in the data table may be either less than or greater than the number of characters actually written in the document field.

After reception of the data table has occurred, resultant numerical values are generated for, and associated with, at least some of the lexicon strings based on a comparison between the phantom character table data and at least some of the lexicon strings. These numeric values serve as lexicon string "scores" so that, upon comparison of such scores, the best match lexicon string can be selected. This comparison can be done either as each lexicon string numeric value is generated or after all numeric values have been generated. As the numeric values are compared, the numeric value indicating that the associated lexicon string which most accurately represents the character string in the field is selected. Once this selection has been made, the selected lexicon string is passed from the process for further processing.

The comparison and, hence, generation of the numeric values, can occur in a variety of ways. Often the scores are generated by mathematically combining the confidence values associated with the phantom characters which are identical to one of the lexicon characters in the lexicon string being compared. Where none of the phantom characters for a given position match one of the lexicon characters for a given position of the lexicon string, a predetermined default confidence value can be substituted for the phantom character confidence value in the mathematical combination. In some embodiments of this class, a lexicon frequency value is also mathematically combined with the confidence values to generate the resultant numeric values or scores. These lexicon frequency values typically relate to the frequency with which a given lexicon string is actually used (e.g., based on a previous statistical analysis of actual lexicon string usage in some particular application) when compared with other possible lexicon strings.

One or more various character matching algorithms may be utilized by the present invention to correct OCR errors. These include simple position-for-position matching, multiple position trinary tree recursive matching, various character substitution techniques and data table and/or lexicon character string position masking techniques.

Additional techniques for correcting OCR errors are also utilized by some methods of this class of embodiments of the present invention. For example, the accuracy of the results obtainable using the present invention can be improved, if the recognition engine is constrained to only output one type of character data (e.g., Arabic numbers or upper case letters) where the field could only contain information of such nature. Thus, the accuracy of the overall process can be greatly enhanced when scanning a United States zip code field, if the recognition engine is constrained to only output Arabic numbers. This technique eliminates, for example, confusion errors from occurring between the numeral 1 and a lower-case letter "1".

Additionally, the phantom character data table may be modified in various ways to generate one or more derivative phantom character data tables prior to character matching. Such modifications may include the substitution of all possible alphanumeric character values for the phantom character data in one or more positions of the data table or the addition of one or more dummy characters into one or more positions of the data table. Penalty values are often included in the generation of the resultant numeric values when data table modification techniques are applied. These penalty values vary in magnitude depending on the type of modification performed. However, they all serve to account for the lower probability of the modified data being correct.

Selection of the various table modification and/or matching techniques is largely a function of the characteristics of the data contained within the fields to be scanned and processed. For example, if the data is of a type in which the number of all possible field values is small, such as a list of all fifty states of the United States, complex matching algorithms can be employed to select the best match lexicon string without the process being overly time consuming. However, the same matching algorithm may be a poor choice where the set of all possible field values includes the set of integers from one to one billion.

Some of the methods in this class of embodiments also entail an additional accuracy testing step. This step involves comparing the resultant numeric value associated with the selected lexicon string to some predetermined accuracy value and outputting a signal indicating that the error correction procedure has yielded indeterminate results if the resultant numeric value is one of less than or greater than the accuracy value. The selected lexicon string is outputted only if the resultant numeric value is the other of less than or greater than the accuracy value.

Another class of embodiments of the present invention performs OCR error correction of information written in multiple character fields or composite fields. A composite field includes any group of simple fields which are related in that there is a commonality of subject matter of the information contained within such simple fields. Thus, each composite field consists of a plurality of related sub-fields. For example, a composite field may consist of the combination of a city field and a state field. However, a composite field would not normally consist of the combination of a firstname field and an occupation field since there is a very tenuous relationship, if any at all, between a person's first name and a person's occupation. Many of the methods in this class of embodiments employ one or more of the methods and/or techniques described above. However, since this class of embodiments is directed toward correcting OCR errors of information contained in more complex combinations of simple fields, other methods and techniques are also employed.

The methods in this second class of preferred embodiments utilize lexicons having composite lexicon strings. In such lexicons each composite lexicon character string consists of a plurality of lexicon sub-strings which are related in some way and associated with one another. Arranging related lexicon sub-strings into composite lexicon character strings greatly decreases the complexity of determining which composite lexicon character string most accurately represents the alphanumeric character string in the composite field. For example, a lexicon of composite lexicon character strings could include lexicon sub-strings for the states of the United States and lexicon sub-strings for the cities of the United States. By associating the state lexicon sub-strings with the city lexicon sub-strings it is much easier to select a correct state lexicon sub-string if a city lexicon sub-string has previously been selected with a high degree of accuracy. Thus, through a contextual analysis of various parts of a composite field, the present invention is able to more accurately select the best composite lexicon character string than has heretofore been possible.

A third class of embodiments includes methods of correcting OCR errors using one or more lexicons of character strings where at least some of the lexicon character strings represent a plurality of possible values. Additionally, some of the methods in this class of embodiments are capable of correcting OCR errors of composite fields where at least one of the sub-fields is of an unpredictable length. Many of the methods in this class of embodiments employ one or more of the methods and/or techniques described above. However, since this class of embodiments preferably utilizes somewhat specialized lexicons, other methods and techniques are also utilized.

BRIEF DESCRIPTION OF THE DRAWINGS

The preferred embodiments of the present invention will be described below with reference to the accompanying drawings wherein like numerals represent like structures and wherein:

FIG. 1 is a plan view of a partially completed multi-field document of a type processed by the present invention;

FIG. 2 is a table illustrating error correction results for first name and surname fields;

FIG. 8 is a table of representative formulas utilized by the present invention.

DETAILED DESCRIPTION OF THE PREFERRED METHOD EMBODIMENTS

Figure 1:
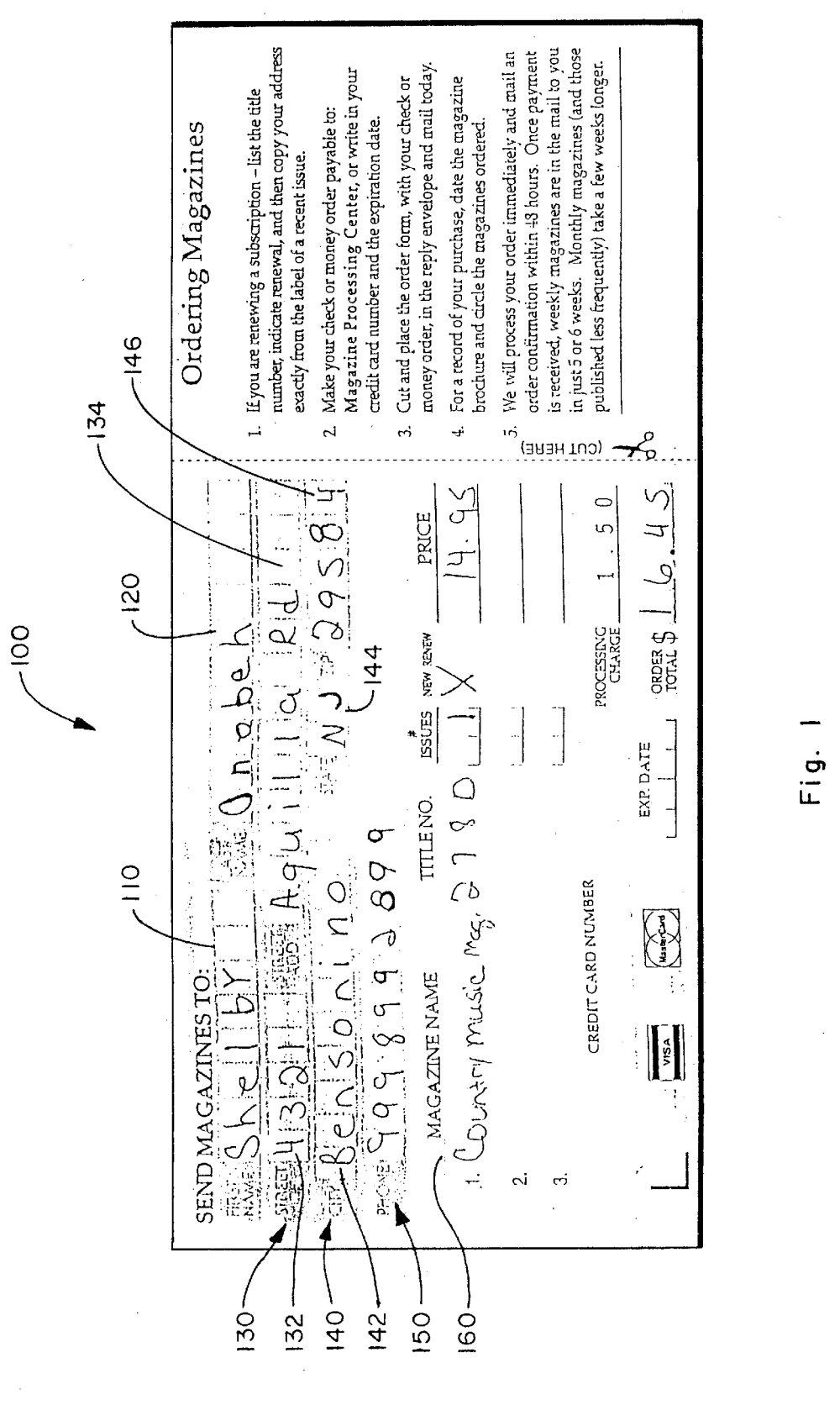
Figure 3:
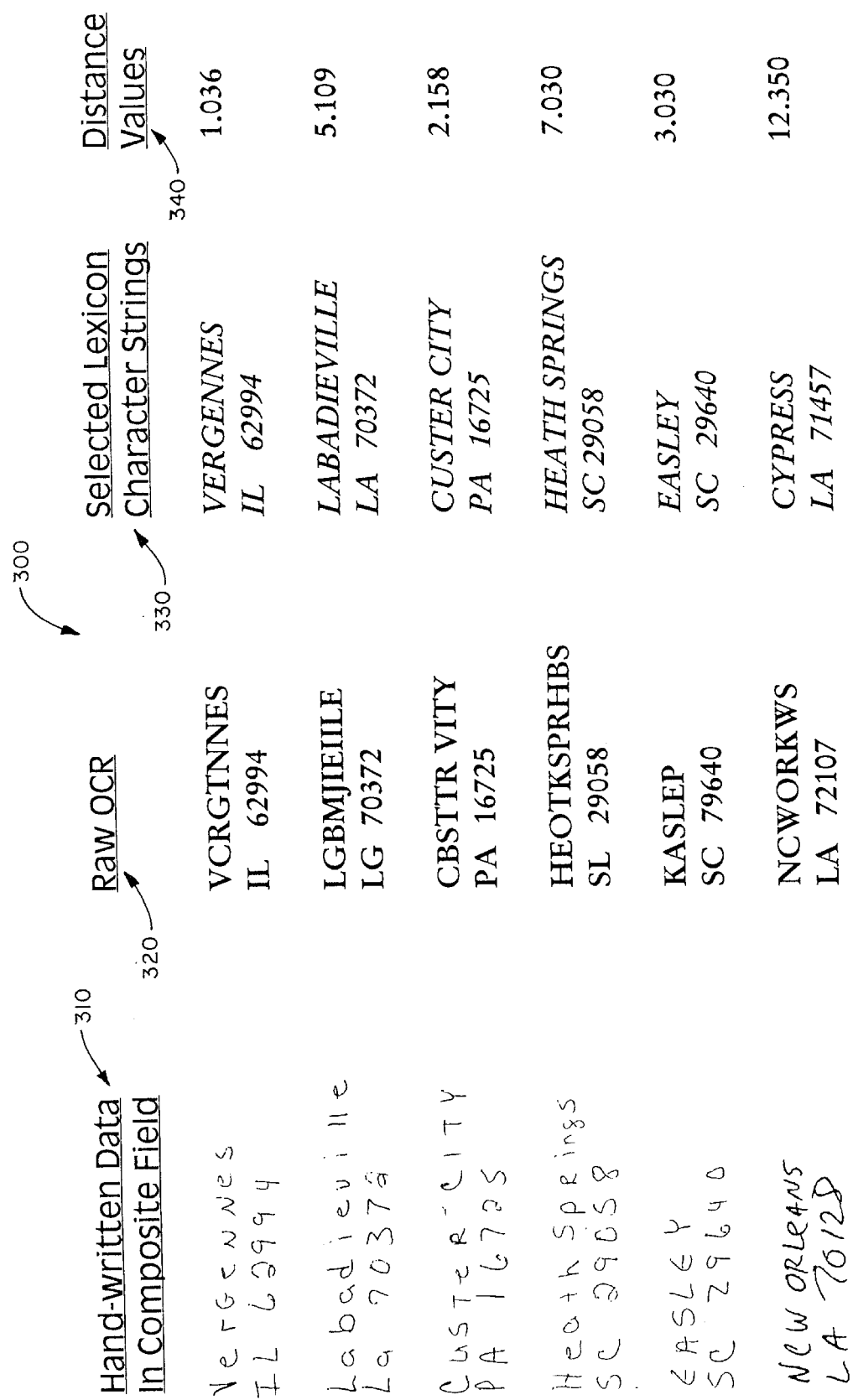
FIG. 3 is a table illustrating error correction results for a city/state/zip code composite field.

With reference now to FIG. 1, there is depicted a partially completed multi-field order form 100 of a type which can serve as the input to a document processor utilizing the present invention. Form 100 includes a plurality of simple and composite alphanumeric character fields for a user to hand write or type various types of information. In this case, each simple field consists of a plurality of individual blocks and it is intended that a user write a maximum of one character per block. Simple fields 110 and 120 are intended to receive a user's first and surname respectively. Composite field 130, which consists of simple fields 132 and 134, is intended to receive a user's complete street address. Similarly, composite field 140 consists of simple fields 142, 144 and 146. It is intended that a user complete composite field 140 by writing a city, state abbreviation, and five-digit zip code in simple fields 142, 144 and 146 respectively. Field 150, for reception of a user's telephone number, can be treated as either a 10 digit simple field or a composite field consisting of three simple fields. Finally, composite field 160 serves as a further example of the type of related information which the present invention may treat as a composite field.

As shown in FIG. 1, the user preferably writes a single handwritten character in each block. However, the present invention is capable of correctly identifying the handwritten information in many cases where the user has inadvertently placed several characters in a single block. Similarly, the present invention can often correct the spelling of words misspelled by the user. The present invention is also capable of correctly identifying the handwritten information in many cases where the user inadvertently skipped a block.

As shown in FIG. 1, a given field may contain a mixture of upper and lower case letters as well as numbers and special characters. It will be appreciated that the present invention is capable of correcting OCR errors of such a mixture of character types. Further, it will also be appreciated that the present invention is capable of processing information written in many different languages. Finally, while the characters depicted in form 100 of FIG. 1 are printed, it should be noted that the present invention is not incompatible with cursive handwriting. One of ordinary skill will readily appreciate that, while correctly scanning and recognizing such information is more difficult than correctly scanning and recognizing typed or hand-printed information, such recognition is presently primarily limited by the capabilities of present recognition engines, not the methods of the present invention.

First Preferred Method Embodiment

Several examples of the OCR error correction results obtainable using a first preferred method embodiment of the present invention are shown in Table 200 of FIG. 2. As shown therein, column 210 contains several handprint first names and surnames as written by a user in simple fields such as fields 110 and 120 of form 100 (FIG. 1).

Column 220 contains a list of phantom character strings. These strings have been compiled from a phantom character data table generated by a recognition engine which has received bit-map image data of the handwritten first names and surnames shown in column 210. Each phantom character string shown consists of the phantom character from each position of the phantom character data table which has the highest associated confidence value. Thus, column 220 depicts the best possible OCR results obtainable without employing the error correction methods of the present invention.

Column 230 contains a list of lexicon strings. These lexicon strings have been selected using the first preferred method embodiment of the present invention as most accurately representing the handwritten names of column 210. In particular, the lexicon strings listed in column 230 have been selected by a first preferred method embodiment (described immediately below) as individually applied to simple fields 110 and 120 of form 100 (FIG. 1). The lexicon of lexicon strings utilized to obtain the list of names shown in column 230 included a list of about 14,000 first names and 330,000 surnames compiled based on a sampling 1,200,000 entries in various telephone directories throughout the United States. The telephone directory information is published in CD-Rom format by Digital Directory Assistance, Inc., 6931 Arlington Road, Suite 405, Bethesda, Md. 20814-5231 under the name Power Finder Phone Disk®.

Column 240 contains a list of distance values. Each distance value is associated with one of the lexicon strings of column 230 and relates to the probability that the associated lexicon string accurately represents one of the handwritten entries of column 210. The distance values of column 240 result from the mathematical combination of a constant, the phantom character confidence values, possibly one or more default confidence values, and, possibly, one or more penalty values. The lexicon string frequency values were pre-determined based on the number of times a given lexicon string appeared during statistical sampling when compared to the entire sample space of 1,200,000 telephone directory entries used to compile the lexicons.

Figure 5A:
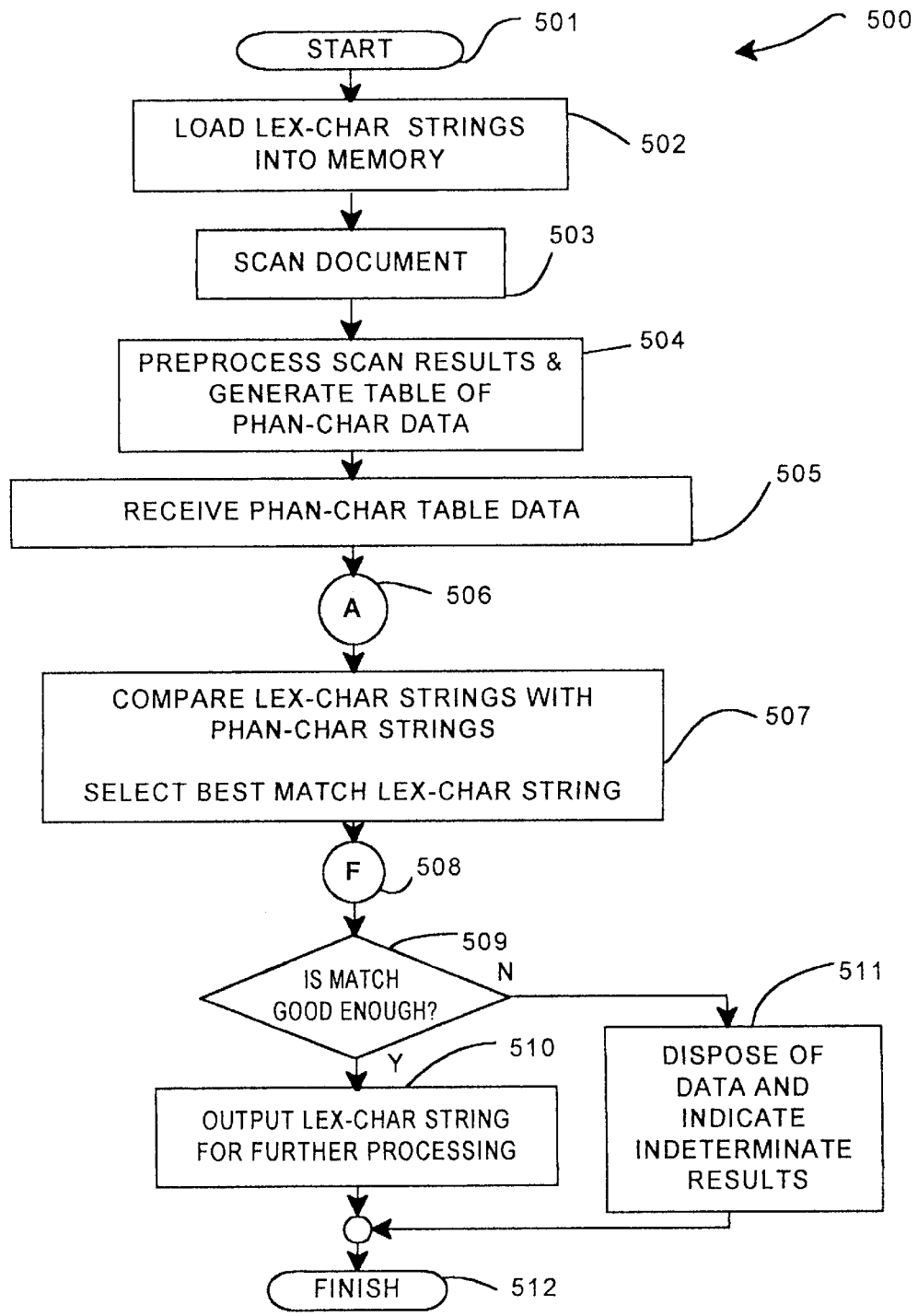
FIG. 5A is a high-level flow chart of a first preferred method embodiment for correcting OCR errors of a simple alphabetic character field.

With particular reference now to FIG. 5A, a first preferred method embodiment of the present invention is shown at 500. This embodiment is directed to correcting OCR errors occurring during scanning and recognition of simple alphanumeric character fields such as either of fields 110 or 120 of FIG. 1. This embodiment is particularly well suited for correcting OCR errors occurring during recognition of first name and surname fields. While FIG. 5A is a high-level flow chart depicting the entire first preferred method embodiment, the portion thereof between identifiers A and F at blocks 506 and 508 will be described in greater detail below.

As may be seen from FIG. 5A, process 500 begins at block 501 and thereafter proceeds to block 502. Block 502 represents the step of retrieving into Random Access Memory the lexicon of lexicon strings for the particular type of field being processed. Preferably, the lexicon retrieved also includes a set of frequency values wherein each frequency value is associated with a lexicon string as described above. Next, block 503 depicts the step of scanning a document such as form 100 of FIG. 1, containing the user-written information in the form of alphanumeric character strings. This step results in bit-mapped image of the field to be processed.

Then, preprocessing of the bit-mapped image data is performed by a recognition engine at block 504. This results in one or more tables of phantom character data. This data is preferably in the form of three cognate pairs of data for each character position identified by the recognition engine. Each cognate pair preferably consists of a phantom character and a confidence value which represents the probability that its associated phantom character accurately represents a character in the field scanned. The recognition engine preferably used with all of the preferred embodiments of the present invention is the Nestor Reader™ produced by Nestor, Inc., 1 Richmond Square, Providence, RI 02906. The technical specifications for the Nestor Reader™ recognition engine may be found in Nestor Reader Developer's Guide which is hereby incorporated by reference.

Once preprocessing is completed, the data table is then received at block 505 for comparison with the lexicon strings. The process then proceeds through identifier A at block 506 to block 507 where comparison and best-match selection operations occur. After the lexicon string most likely to accurately represent the alphanumeric character string of the field has been selected, the process proceeds through identifier F at block 508 to block 509. Here, a determination is made whether or not the selected lexicon string is sufficiently accurate that the lexicon character string should be outputted for further processing. If so, the lexicon string is outputted at block 510 and the process terminates at block 512. Otherwise, the match results are disposed of and a signal indicating indeterminate results is produced at block 511. Such a determination results from a comparison between a distance value, which is based on the resultant numeric value of the selected lexicon string, and some predetermined threshold value. For example, using the distance values shown in column 240 (FIG. 2), a threshold value of approximately 2.55 would successfully distinguish between the lexicon strings which accurately represent the information in column 210 and those which do not. Finally, regardless of the determination made in block 509, the process terminates at block 512.

With joint reference now to Figs. 5B–5E the comparison/selection operation of block 507 (FIG. 5A) will be described in greater detail. The operation of block 507 has been broken down into three constituent operations as illustrated in process portions 520, 560 and 580 of FIGS. 5B, 5D and 5E respectively. Process portions 520, 560 and 580 are serially linked together by identifiers D and E at blocks 533 and 574 respectively. Thus, when sequentially performed, operations 520, 550 and 580 collectively perform the comparison/selection operation of block 507. Additionally, process portions 520, 560 and 580 each reference a character comparison sub-routine indicated at 540 of FIG. 5C to be described still later.

Figure 5B:
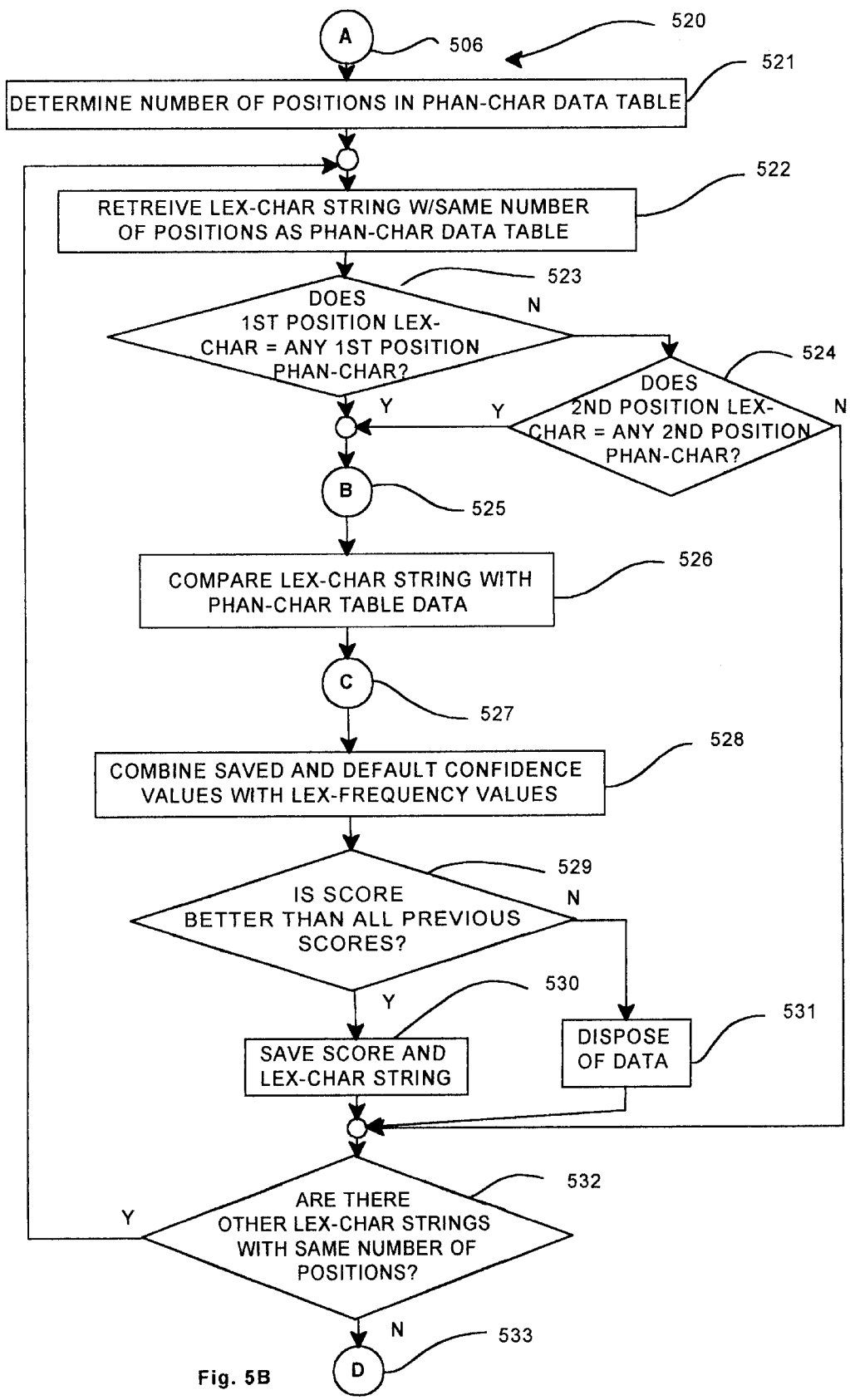
FIGS. 5B–5E are low-level flow charts illustrating various steps shown in the flow chart of FIG. 5A in greater detail.

Referring now to FIG. 5B, the comparison/selection operation of block 507 begins with identifier A at block 506. Since the lexicon strings and phantom character data table have already been received, the process proceeds to block 521 where the number of character positions in the data table is determined. Then, a lexicon string with the same number of character positions as the data table is retrieved from the lexicon at block 522. Next, a determination is made whether or not the first character of the lexicon string matches any of the phantom characters in the first position of the data table at block 523. If so, the process proceeds to the comparison sub-routine of block 526 via identifier B at block 525. If not, the process continues to block 524 where a determination is made whether or not the second character of the lexicon string matches any of the phantom characters in the second position of the data table. If not, the process essentially ends for this particular lexicon string as the process passes down to block 532. In the event that there is a second position character match, the process continues to block 526 where each character of the lexicon character string is compared with the data in the corresponding position of the data table. It will be appreciated that the steps of blocks 523 and 524 are features of this preferred embodiment and not necessary for the present invention to operate. In the event that a phantom character matches the lexicon character, the phantom character and its associated confidence value are stored. This data will eventually be used to generate a resultant numeric value, or score, for the lexicon string. Otherwise, a predetermined default confidence value is substituted for the phantom character confidence value.

The process then continues to block 528, via identifier C at block 527, where the phantom character confidence values, the default confidence values, and the lexicon string frequency value are mathematically combined. The above-mentioned values are preferably decimals greater than zero and less than or equal to one. These values are preferably multiplied together. Once the values have been combined, the resultant numeric value, or resultant score, is passed to block 529 where it is tested to determine whether it is better than all previous resultant scores. If this score is the best score, it is saved along with the associated lexicon string at block 530 and the process continues to block 532. Otherwise, the score and the lexicon string are disposed of at block 531 and the process continues to block 532.

At block 532, a determination is made whether there are any other lexicon strings with the same number of character positions as the data table. If not, the process passes through identifier D at block 533 to compare longer lexicon strings with the data table as shown in process portion 560 in FIG. 5D. If, on the other hand, there are other lexicon strings with the same number of characters, the process returns to block 522. The ordinary artisan will readily appreciate that the above-described process will then repeat until all lexicon strings with the same number of character positions as the data table have been checked. When this occurs, the process will, as mentioned above, pass to process portion 560 of in FIG. SD via identifier D at block 533.

Figure 5C:
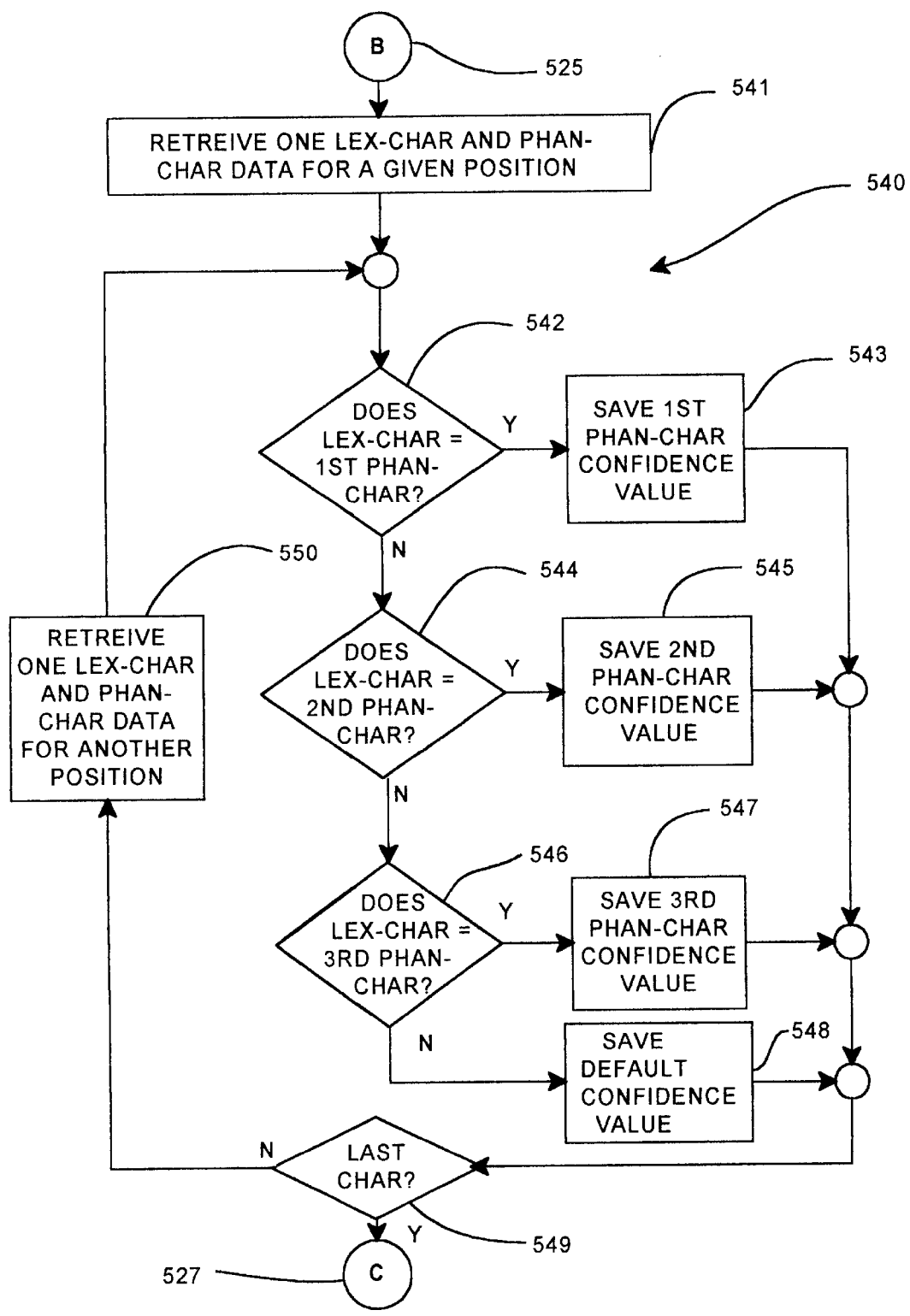
Figure 5D:
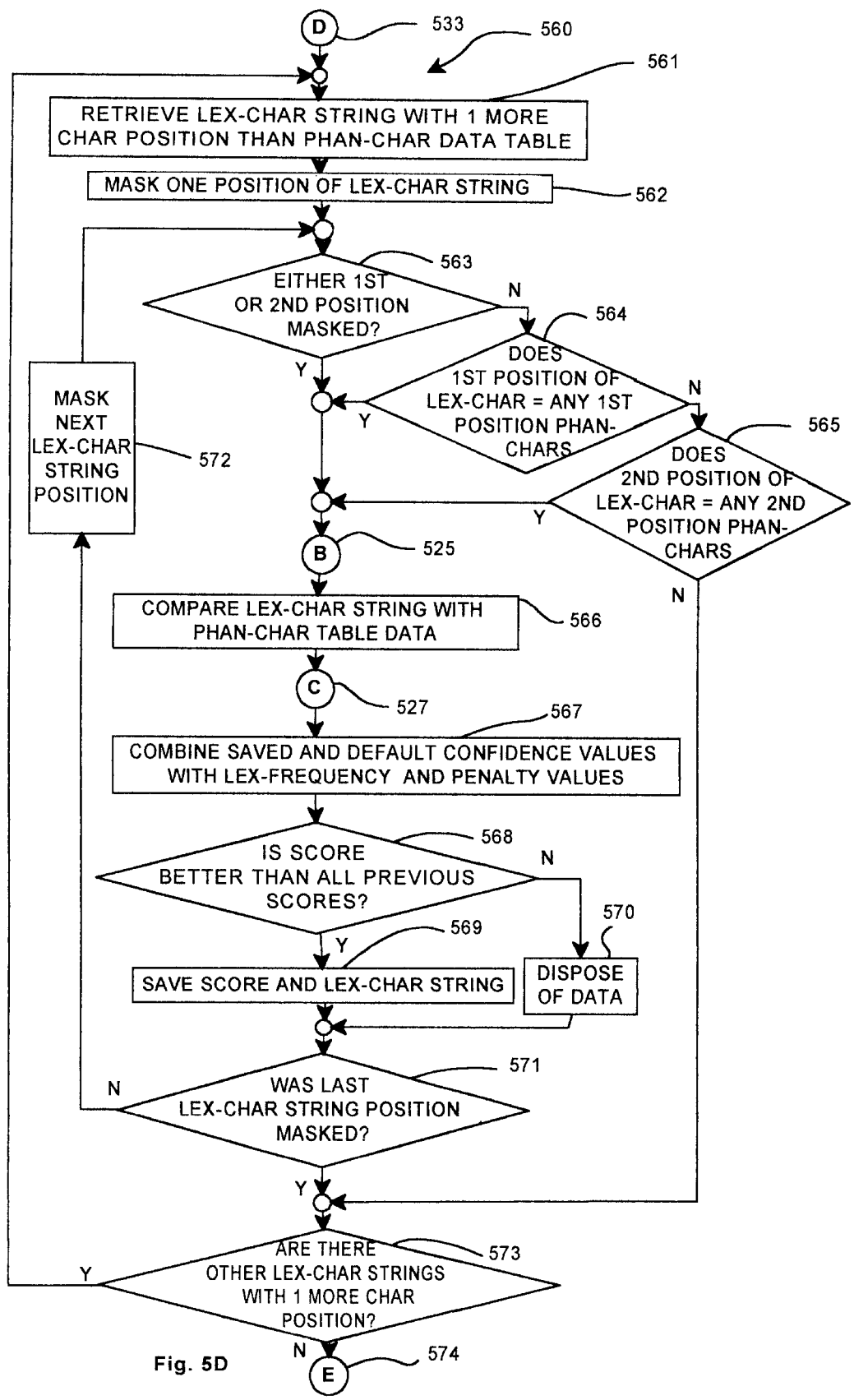

Once all of the lexicon strings having the same number of character positions as the data table have been checked, process portion 560 of FIG. 5D is executed. The retrieval step of block 561 is executed first , and the process passes to block 562 where one character of the retrieved lexicon string is masked. This masking operation effectively modifies the lexicon string such that the number of positions in the lexicon string is, as with process portion 520 above, equal to the number positions in the data table. It will be readily appreciated that alternative embodiments could also retrieve longer lexicon strings from the lexicon as long as multiple lexicon characters are masked.

Once masking occurs, the modified lexicon string passes through decision block 563. At block 563, if it is determined that either the first or second lexicon characters were masked, the process passes to block 566 via identifier B at block 525. Otherwise, the process passes to block 564 where it is determined whether the character in the first position of the modified lexicon string matches any of the phantom characters in the first position of the data table. If so, the process continues through identifier B at block 525 to block 566. If not, a determination is made at block 565. This determination is whether or not the character in the second position of the modified lexicon string matches any of the phantom characters in the second position of the data table. If so, the process passes to block 566 via identifier B at block 525. Otherwise, the process essentially ends for this particular modified lexicon string as the process passes down to block 573.

In the event that the result of any of the determinations of blocks 563, 564 and 565 is in the affirmative, then each character of the modified lexicon string is compared with the data in the corresponding position of the data table. In the event that a phantom character matches a lexicon character, the phantom character and its associated confidence value are stored so that the information can be used to generate a resultant numeric value. Otherwise, a predetermined default confidence value is substituted for the phantom character confidence value.

The process then continues to block 567, via identifier C at block 527, where the phantom character confidence values, the default confidence values, the lexicon string frequency value and a predetermined penalty value are mathematically combined. The penalty value is included in the combination in recognition of the fact that the numeric value results from a comparison between a modified lexicon string and the data table. The penalty value is preferably a decimal greater than zero and less than or equal to one. The preferred method of combining the penalty value with the other values is multiplication.

Next, the score for this modified lexicon character string is compared with the previous best match score at block 568 to determine whether this score is the best score. If this is the best score, it, along with the associated lexicon string (with the masking removed) is saved at block 569 and the process continues to block 571. Otherwise, the score and its associated modified lexicon string are disposed of at block 570 and the process passes to block 571.

At block 571, a determination is made whether there are any lexicon string positions of this particular lexicon string which haven't been masked yet. If so, the process passes up to block 572 where another lexicon string position is masked. Then, the process returns to block 563 where the operations described immediately above will be repeated. The ordinary artisan will readily understand that where only one character at a time is masked, the number of times that the masking step of block 572 will be executed will never be greater than the number of positions in the particular lexicon string. Of course, when the last lexicon string position is masked and the process reaches block 571 the process will pass down to block 573.

At block 573, a determination is made whether or not there are any other lexicon strings with one more character position than the phantom character data table. If there are, the process returns to the beginning of process portion 560 and enters block 561. The process will, of course, repeat until all lexicon strings having one more character position than the phantom character data table have been tested. At that point, the process exits block 573 and passes to process portion 580 of FIG. 5E via identifier E at block 574.

Figure 5E:
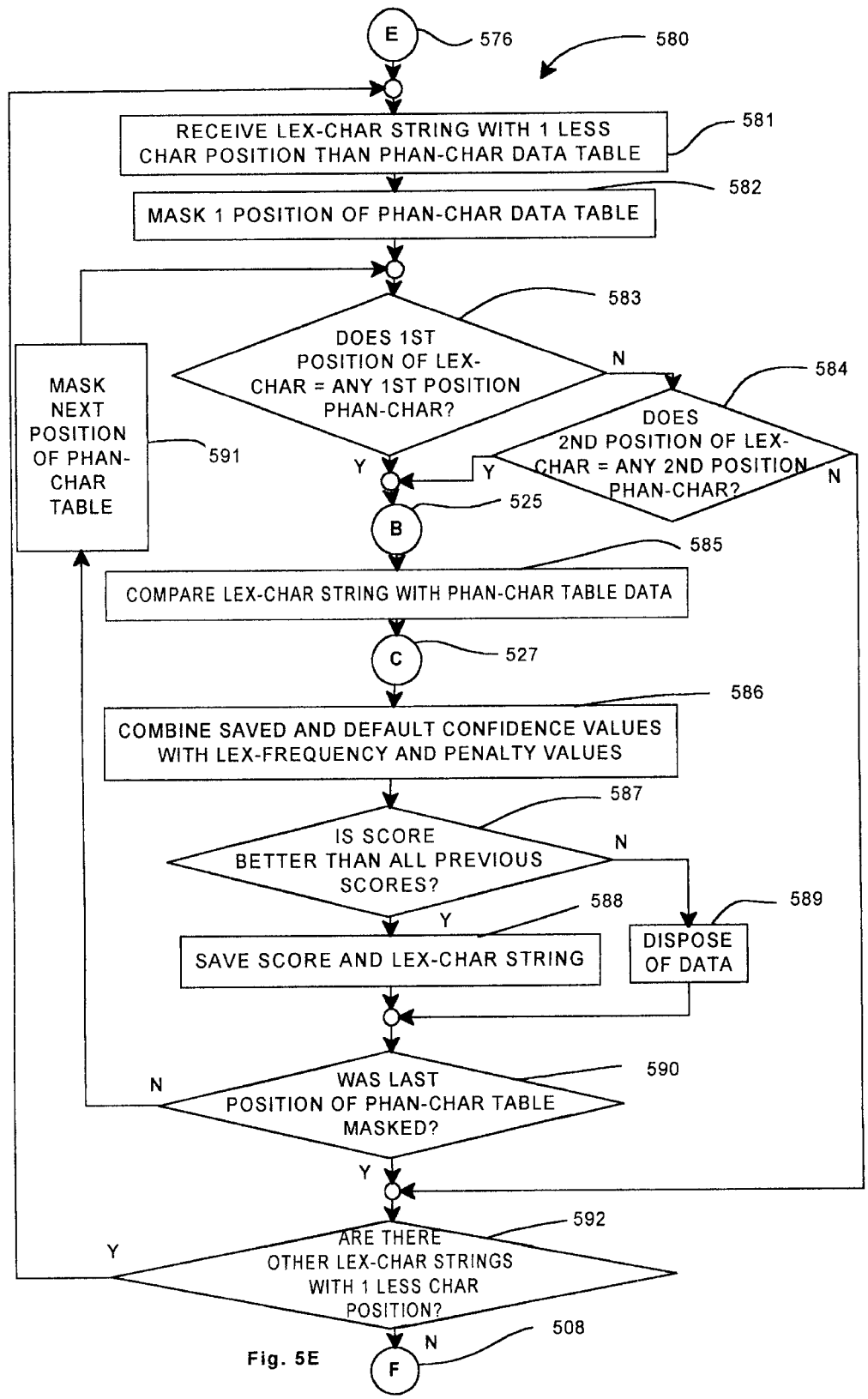

Once all of the lexicon strings having one more character position than the data table have been checked, process portion 580 of FIG. 5E is executed. The retrieval step of block 581 is executed first and the process passes to block 582 where one position of the phantom character data table is masked. This masking operation effectively modifies the data table such that the number of positions in the data table is, as with process portions 520 and 560 above, equal to the number positions in the retrieved lexicon string. It will be readily appreciated that alternative embodiments could retrieve shorter lexicon character strings as long as multiple data table character positions are masked.

Once masking occurs, the process passes through decision block 583. At block 583, if it is determined that the first character of the lexicon string matches any of the phantom characters in the first position of the modified data table, the process passes to block 585 via identifier B at block 525. Otherwise, the process passes to block 584 where it is determined whether or not the character in the second position of the lexicon string matches any of the phantom characters in the second position of the modified data table. If so, the process continues through identifier B at block 525 to block 585. Otherwise, the process essentially ends for this particular lexicon string as the process passes down to block 592. It should be noted that the steps of blocks 583 and 584 are features of this preferred embodiment and not necessary for the present invention to operate.

In the event that the result of either of the determinations of blocks 583 or 584 is in the affirmative, each character of the lexicon string is compared with the phantom characters in the corresponding position of the modified data table. In the event that a phantom character matches a lexicon character, the phantom character and its associated confidence value are stored. This data will eventually be used to generate a resultant numeric value, or resultant score, for the lexicon string. Otherwise, a predetermined default confidence value is substituted for the phantom character confidence value. The process then continues to block 586, via identifier C at block 527, where the phantom character confidence values, the default confidence values, the lexicon string frequency value and a predetermined penalty value are mathematically combined. As above, these values are all preferably decimals between zero and one, and the preferred method of combination is multiplication.

Next, the resultant score for this lexicon string is compared with the previous best match score at block 587 to determine whether this resultant score is the best score. If this is the best, it, along with the associated lexicon string is saved at block 588 and the process continues to block 590. Otherwise, the score and its associated lexicon string are disposed of at block 589 and the process, passes to block 590. At block 590, a determination is made whether all of the data table positions have been masked. If not, the process passes up to block 591 where another data table position is masked. Then, the process returns to block 583 where the operations described immediately above will be repeated for a new modified data table. The ordinary artisan will readily understand that where, as here, one data table position at a time is masked, the number of times that the masking step of block 591 will be executed will never be greater than the number of positions in the data table.

Of course, when the final data table position is masked and the process reaches block 590, the process will pass down to block 592. At block 592, a determination is made whether or not there are any other lexicon strings with one less character position than the phantom character data table. If there are, the process returns to the beginning of process portion 580 and enters block 581. The process will, of course, repeat until all lexicon strings having one less character position than the phantom character data table have been tested. Then, the process will pass to identifier F at block 508. Upon exit from block 592 this time, the process re-enters the overall process 500, via identifier F at block 508, and continues through completion.

The position comparison sub-routine 540 of FIG. 5C will be executed as the process enters blocks 526, 566 and 585 of FIGS. 5B, 5D and 5E respectively. Comparison sub-routine 540 performs the lexicon string/data table matching operation on a character-by-character basis. Each time sub-routine 540 is executed the process enters block 541 via identifier B at block 525.

Upon entry into block 541, the process retrieves one lexicon character from the particular lexicon string being compared and the phantom character data for the corresponding position of the data table. In all of the preferred embodiments described herein, the data tables generated by the recognition engine contain three phantom characters for each position of the data table. However, the ordinary artisan will appreciate that, if the data table generated by the recognition engine contains a different number of phantom characters per data table position, sub-routine 540 can easily be modified to accommodate such data tables. While increasing the number of phantom characters per data table position typically improves the accuracy of the overall process, one trade off is a corresponding increase in processing time.

Once the data to be compared is retrieved in block 541, the process continues to block 542. At block 542 the lexicon character and the first phantom character are compared. If these characters match, the process passes to block 543 where the phantom character and its associated confidence value are stored for future use. If the characters do not match, the process passes to block 544 where the lexicon character and the second phantom character are compared. If these characters match the process passes to block 545 where the phantom character and its associated confidence value are stored for future use. If these characters do not match, the process passes to block 546 where the lexicon character and the third phantom character are compared. If these characters match the process passes to block 547 where the phantom character and its associated confidence value are stored for future use. If none of the phantom characters match the lexicon character, the process passes to block 548 where a predetermined default confidence value is stored instead of a phantom character and its associated confidence value.

Regardless, of whether the process passes through blocks 543, 545 547 or 548, it will then continue to block 549 where it will be determined whether or not the last lexicon string character has been compared with the phantom character table data. If so, the process passes back to one of process portions 526, 566 or 585 via identifier C at block 527. If not, the process enters block 550 where a lexicon character from another lexicon string position and phantom character table data for another data table position are retrieved. Then, the process returns to block 542 where the comparison subroutine repeats with the new character data. Of course, such repetition will continue until all of the lexicon characters have been compared with phantom character table data. Thereafter, the process returns to one of either process portion 526, 565 or 585 in the manner described above.

Second Preferred Method Embodiment

Several examples of the OCR error correction results obtainable using a second preferred method embodiment of the present invention are shown in Table 300 of FIG. 3. As shown therein, column 310 contains several handprint city/state/zip code entries which represent information which would typically be written by a user in composite field 140 of form 100 (FIG. 1).

Column 320 contains a list of composite phantom character strings. These composite strings have been compiled from phantom character data tables generated by a recognition engine which has received bit-map image data of the information shown in column 310. It will be appreciated that since composite field 140 of form 100 consists of simple fields 142, 144 and 146 (i.e., alphanumeric character sub-fields 142, 144 and 146), the recognition engine will generate three phantom character data tables. These data tables correspond with sub-fields 142, 144 and 146 respectively. Each phantom character string shown in column 320 consists of the phantom character from each position of each data table which has the highest associated confidence value. Thus, column 320 depicts the best possible OCR results obtainable without employing the error correction methods of the present invention.

Column 330 contains a list of composite lexicon strings. These composite lexicon strings have been selected using a second preferred method embodiment (described below) as applied to composite field 140 of form 100 (FIG. 1). The lexicon utilized to produce the list of composite strings shown in column 330 consisted of an exhaustive list of all cities, state abbreviations and five digit zip codes recognized by the United States Postal Service (U.S.P.S.). The lexicon was constructed using information contained in a CD-Rom publication distributed by the United States Postal Service National Customer Support Center, 6060 Primary Parkway, Suite 201, Memphis, Tenn. 38188-0001, entitled "City State, Street Alias, and Zone Split File." The technical content of the "City State, Street Alias, and Zone Split File" is described in the U.S.P.S. "Address Information Products Technical Guide" the entire contents of which are hereby incorporated by reference.

Column 340 contains a list of distance values for the list of composite lexicon strings shown in column 330. Each distance value is associated with one of the composite lexicon strings of column 330 and relates to the probability that the associated composite lexicon string accurately represents one of the handwritten entries of column 310. These distance values result from the mathematical combination of a constant, the phantom character confidence values, possibly one or more default confidence values, and possibly one or more penalty values. The second preferred embodiment of the present invention, as described below, does not employ a lexicon having frequency values associated with each lexicon entry. However, it is contemplated that such lexicons could be employed in alternative embodiments in a manner similar to that of the first preferred method embodiment of the present invention. All of the above mentioned values are preferably decimals greater than zero and less than or equal to one. The preferred method of mathematical combination is multiplication.

Figure 6A:
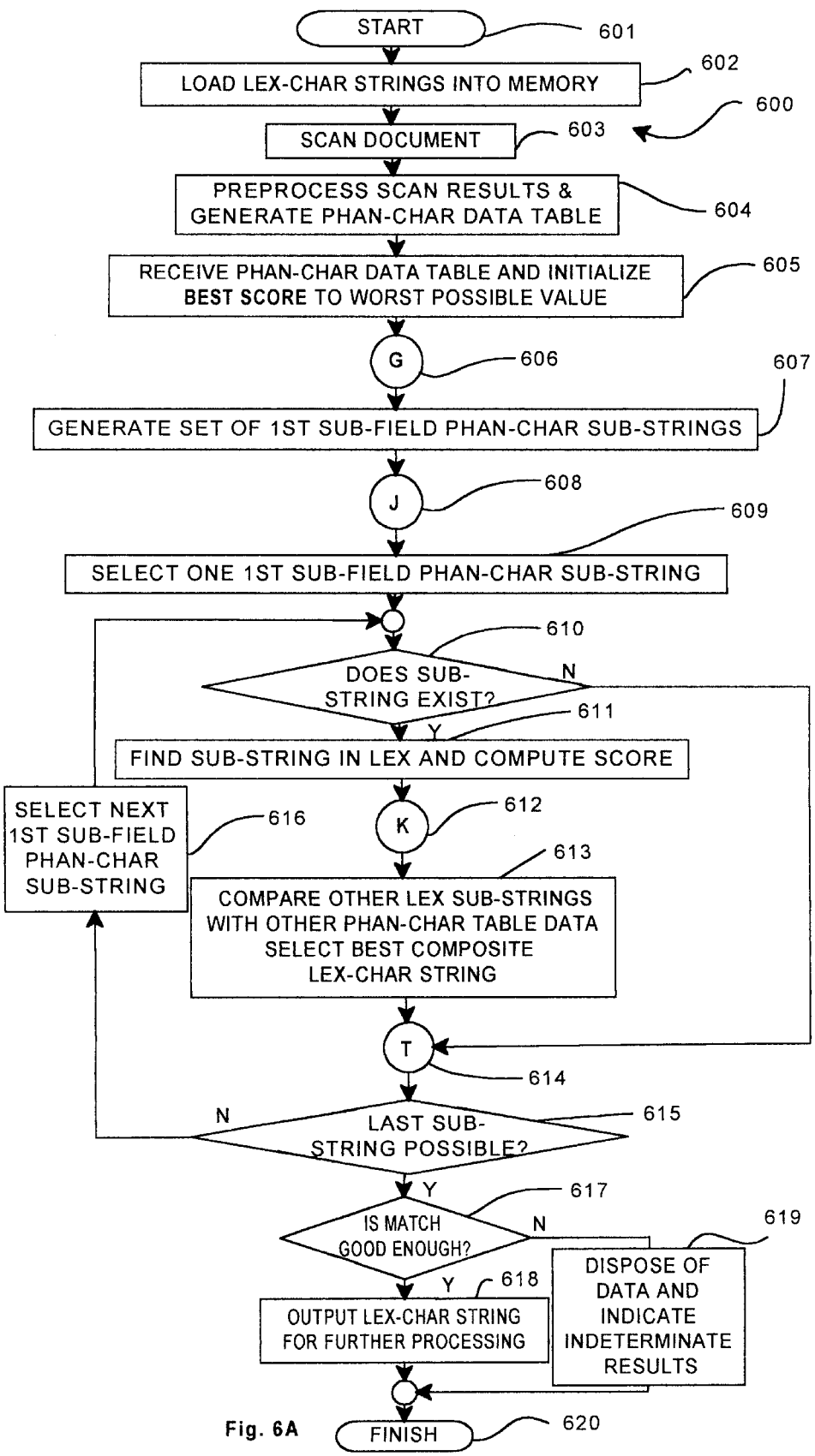
FIG. 6A is a high-level flow chart of a second preferred method embodiment for correcting OCR errors of a composite alphanumeric character field.

With particular reference now to FIG. 6A, a second preferred method embodiment of the present invention is shown at 600. This embodiment is directed to correcting OCR errors occurring during scanning and recognition of composite alphanumeric character fields such as composite field 140 of FIG. 1. While this embodiment is particularly well suited for correcting OCR errors occurring during recognition of city/state/zip code composite fields, it will be readily appreciated that the methods described herein are directly applicable to many other types of fields. It should be noted that FIG. 6A is a high-level flow chart of the entire second preferred method embodiment and that the portions thereof between identifiers G and J at blocks 606 and 608 and between identifiers K and T at blocks 612 and 614 will be described in greater detail below.

As may be seen from FIG. 6A, the process 600 begins at block 601 and thereafter proceeds to block 602 which represents the step of retrieving the lexicon of composite lexicon strings for the particular type of composite field being processed. Next, block 603 depicts the step of scanning a document, such as form 100 of FIG. 1, containing the user-written information in the form of a composite alphanumeric character string. This scanning step results in bit-map image data of the document being processed. Then, preprocessing of the raw bit-mapped data is performed by a recognition engine at block 604. This results in one or more tables of phantom character data for each sub-field of the composite alphanumeric character field. As with the first preferred method embodiment, this data is preferably in the form of three cognate pairs of data for each character position identified by the recognition engine. Each cognate pair, again, preferably consists of a phantom character and a confidence value which represents the probability that its associated phantom character actually represents a character in the field scanned.

The table data is then received at block 605 and a variable BEST SCORE is initialized to the worst possible value. The process then proceeds through identifier G at block 606 to block 607 where a set of first sub-field phantom character sub-strings are generated. The process then passes through identifier J at block 608 to block 609 where one of the first sub-field phantom character strings from the above-mentioned set of sub-strings is selected. The process then continues to block 610. Here, a determination is made whether or not the selected phantom character sub-string exists, i.e. could the sub-string possibly match the first sub-field lexicon sub-string of any of the composite lexicon character strings. Since, in this embodiment, the first lexicon sub-strings represent five digit zip codes for the United States, it is determined whether the selected sub-string is a valid zip code. If not, the process essentially ends for this particular phantom character sub-string and the process passes to block 615 via identifier T at block 614. If so, the process moves to block 611 where a first sub-field lexicon sub-string which matches the phantom character sub-string is located in the lexicon. Additionally, a first lexicon sub-string score is computed by mathematically combining the confidence values associated with the confidence values of the selected phantom character sub-string.

Then, the process passes to block 613 via identifier K at block 612. Upon entry into block 613, the process brings a first lexicon sub-string which matches the selected first phantom character sub-string, and a score associated with the first lexicon sub-string. Within block 613, the other lexicon sub-strings of the composite lexicon string, i.e. the other lexicon sub-strings associated with the first lexicon sub-string, are compared with the other corresponding phantom character data tables. In the case of this embodiment, the other lexicon sub-strings represent cities and state abbreviations for cities and states in the United States. Of course, as mentioned above, this embodiment can be applied to many different types of composite field information. As the other lexicon sub-strings and the other phantom character data tables are compared, the best composite lexicon character string is selected and an associated composite numerical value is generated.

Process 600 then passes to block 615 via identifier T at block 614. At block 615 a determination is made whether or not all of the previously generated first phantom character sub-strings have been checked. If not, the process continues up to block 616 where another first phantom character sub-string is selected. Then, the process returns to block 610 and repeats the procedure described immediately above until the last of the previously generated first phantom character sub-strings is checked and the process enters block 615. When this occurs, the process will pass down to block 617 where a determination will be made whether or not the selected composite lexicon string is sufficiently accurate that the composite lexicon string should be outputted for further processing. If so, the composite lexicon string is outputted at block 618 and the process terminates at block 620. Otherwise, the match results are disposed of and a signal indicating indeterminate results is produced at block 619. The determination results from a comparison between a distance value, which is based on the resulting composite numeric value of the selected composite lexicon string, and some predetermined threshold value. As shown in FIG. 3, a threshold value of approximately 10 would successfully distinguish between the composite lexicon strings which accurately represent the information in column 310 and those which do not. The increase in the threshold value applied here, as compared with the threshold value suggested for the first preferred method embodiment, is a reflection of the increased complexity of matching a composite field relative to a simple field. Finally, once a signal indicating indeterminate results is produced, the process terminates at block 620.

With joint reference now to FIGS. 6B–6C, the step of generating a set of first phantom character sub-strings of blocks 607 will be described in greater detail. While the operation of block 607 is illustrated at process portion 630 (FIG. 6B), the step of block 640 shown therein is itself shown in greater detail at process portion 650 (FIG. 6C).

Figure 6B:
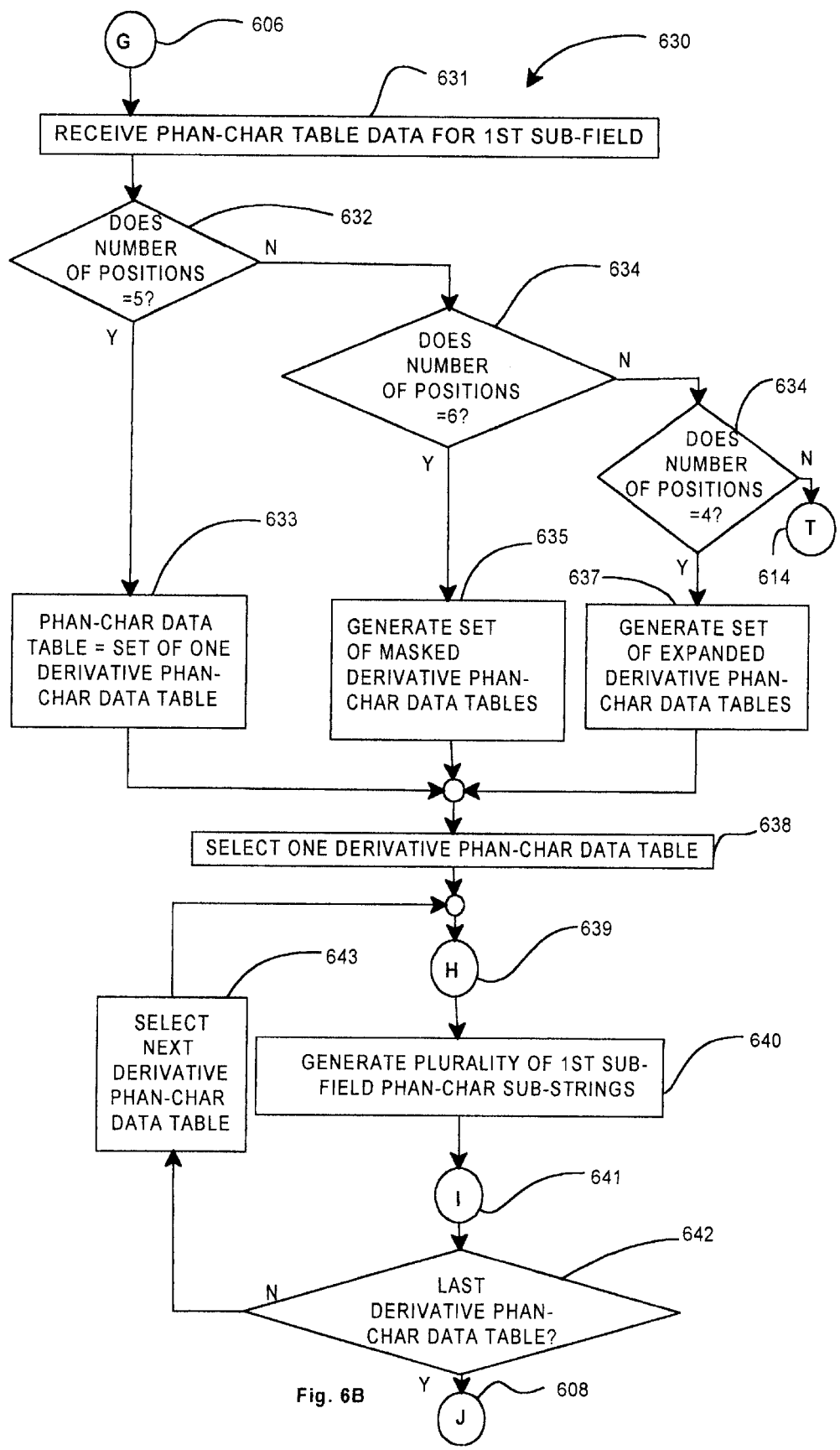
FIGS. 6B–6F are low-level flow charts illustrating various steps shown in the flow chart of FIG. 6A in greater detail.
Figure 6C:
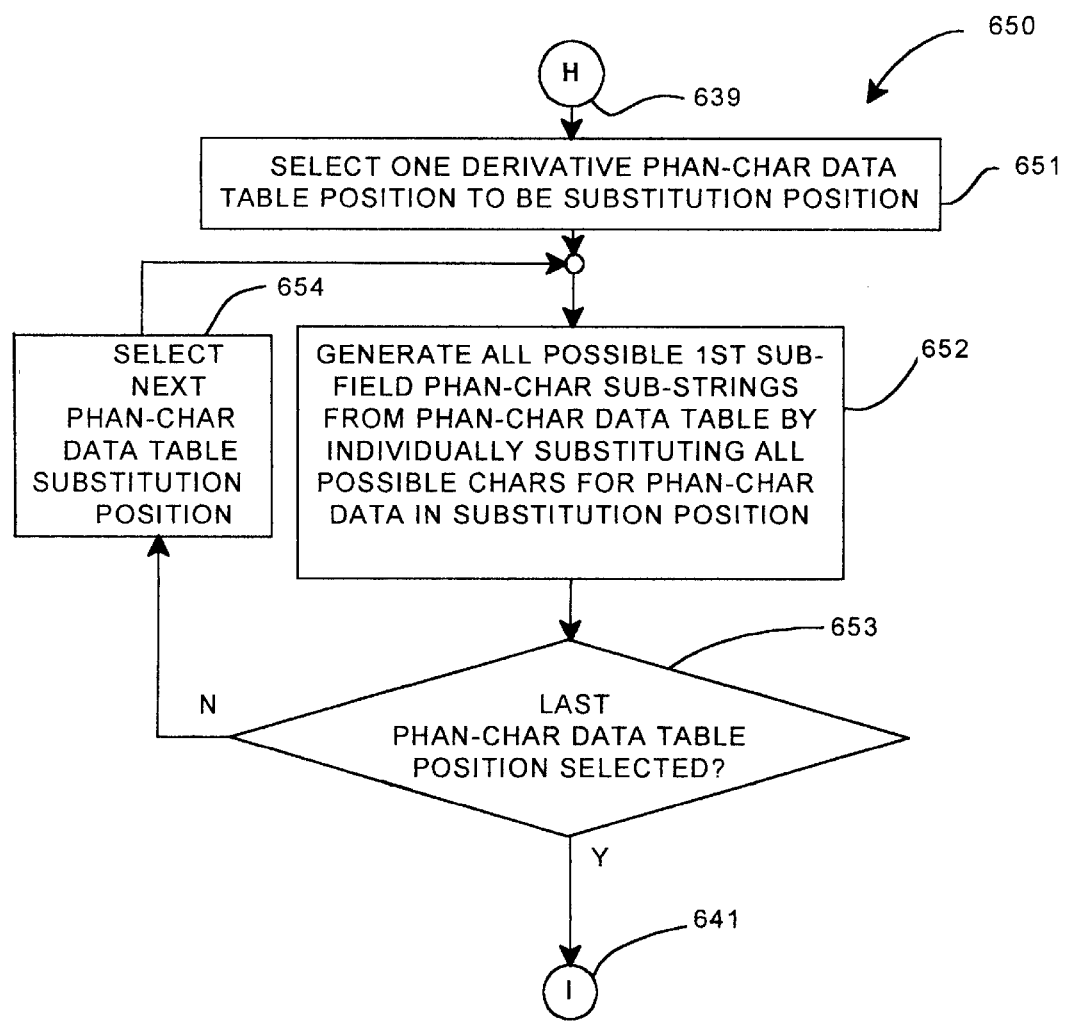

Referring now to FIG. 6B, the sub-string generation operation of block 607 begins with identifier G at block 606. Since the phantom character data tables have already been received at block 605, the process proceeds to block 631 where the first phantom character data table is received. Next, the process moves to block 632 where a determination is made whether the number of character positions in the first phantom character data table equals five. It will be recognized that the reason why this embodiment checks to see if the number of character positions in the data table equals five is that an ordinary United States zip code will have five digits. Of course, if this embodiment is applied to other types information (such as telephone numbers) the numbers mentioned herein will be adjusted accordingly.

If the data table does have five character positions, the process proceeds to block 633 where the first phantom character data table is considered to be the derivative phantom character data table in a set of one first derivative data tables. Otherwise, the process moves to block 634 where a determination is made whether the number of character positions in the first phantom character data table equals six. If so, the process moves to block 635 where a set of six first derivative data tables is generated. Each of these first derivative data tables consists of the phantom character data table received at block 631 with one data table character position masked. As a result of this masking, each of the six first derivative data tables will now have five character positions. One of ordinary skill in the art will readily appreciate that, in alternative embodiments, the same result can be achieved where the number of character positions in the data table is greater than six, if multiple character positions are masked simultaneously.

In the event that the number of positions is neither five nor six, the process moves to block 634. Here, a determination is made whether the number of positions of the phantom character data table received at block 631 is equal to four. If so, the process proceeds to block 637 where a set of five expanded derivative data tables is generated. Each of these first derivative data tables consists of the phantom character data table received at block 631, but with a dummy character inserted into one of the character positions.

In the event that the number of positions in the phantom character data table does not equal four, five or six, no first phantom character sub-strings will be generated and the process essentially ends for this first lexicon sub-string as the process passes down to block 615 (FIG. 6A) via identifier T at block 614. If, on the other hand, the process moves through any of blocks 633, 635 or 637, it will then enter block 638 where one of the first derivative data tables generated above is selected.

Next, the process moves through identifier H at block 639 to block 640 where a plurality of first phantom character sub-strings are generated. The details of this operation will be described below with reference to FIG. 6C. After exiting block 640 and passing through identifier I at block 641, the process continues down to block 642. Here, it is determined whether there are any first derivative data tables which have not been selected. If so, the process passes to block 643 where another first derivative data table is selected. The process then returns to block 640, via identifier H at block 639, where additional first phantom character sub-strings are generated. It will readily be apparent to those of ordinary skill that this portion of the process will repeat until all of the first derivative data tables have been selected and the first phantom character sub-strings generated therefrom. When this occurs and the process passes through block 642 the last time, it will continue down to block 609 (FIG. 6A) via identifier J at block 608.

Referring now to FIG. 6C, the step of generating a plurality of first sub-field phantom character sub-strings of block 640 (FIG. 6B) will be described in greater detail. This operation is generally indicated at process portion 650 of FIG. 6C and begins with identifier H at block 639. Since the process enters block 639 having already selected one of the first derivative data tables at block 638 (FIG. 6B), the process moves directly to block 651. At block 651, one character position of the selected data table is selected as a substitution position.

Next, the process moves to block 652. Here, all of the possible first phantom character sub-strings are generated from the first derivative data table by (1) individually substituting all possible character values for the phantom character data in the selected substitution position; (2) retaining each phantom character of the original phantom character data for the other positions; and (3) constructing all possible sub-strings from the data in the modified data table using all of the substituted character values and all of the retained phantom characters. For example, in the case of this preferred embodiment, the first phantom character sub-strings represent five digit zip codes. In the United States, such zip codes are formed exclusively of Arabic numerals between zero and nine. At block 652, the numerals zero through nine are individually substituted for the phantom character data originally located in the previously selected substitution position of the previously selected first derivative data table. The substitution of each numeral, in effect, creates a new first derivative data table and all of the possible phantom character sub-strings which can be generated using that numeral in the substitution position are created. This process occurs until all of numerals zero through nine have been used in the sub-string generation operation. Since the preferred embodiment receives three phantom characters for each position of the data table, 810 (10×3×3×3×3) phantom character sub-strings will be generated. After the first phantom character sub-strings have been generated, the process moves to block 653 where a determination is made whether or not all of the character positions of the selected first derivative data table have been selected. If so, the process passes back to the process portion 630 (FIG. 6B) via identifier I at block 641. In the event that other character positions have not yet been selected, the process moves to block 654. At block 654, another character position is selected as the substitution position. The process then returns to block 652 where further phantom character sub-strings are generated as described above. This portion of the process repeats until the last character position has been selected as the substitution position and, in the case of zip code data, a total of 4050 (810×5) phantom character sub-strings have been generated. As the process passes through block 653 this time, it re-enters process portion 630 (FIG. 6B) via identifier I at block 641 as described above.

It will be appreciated that, since process portion 650 generates phantom character sub-strings with one first derivative data table and since there could be up to six such data tables, it is conceivable that a tremendous number of first phantom character sub-strings will be generated. Accordingly, this procedure is best suited for applications where the information contained within the first sub-field is limited to few characters and/or where the set of all possible character values for each character position is small (e.g., Arabic numerals from 0–9, as opposed to the twenty-six letters of the English alphabet).

With joint reference now to FIGS. 6D–6F, the comparison/selection operation of block 613 (FIG. 6A) will now be described in greater detail. While execution of the operation of block 613 is described in greater detail in process portion 660 (FIG. 6D) several operations described therein are covered in further detail in process portions 680 and 700 of FIGS. 6E and 6F respectively. Additionally, process portion 680 (FIG. 6E) references character comparison sub-routine 540 of FIG. 5C.

Figure 6D:
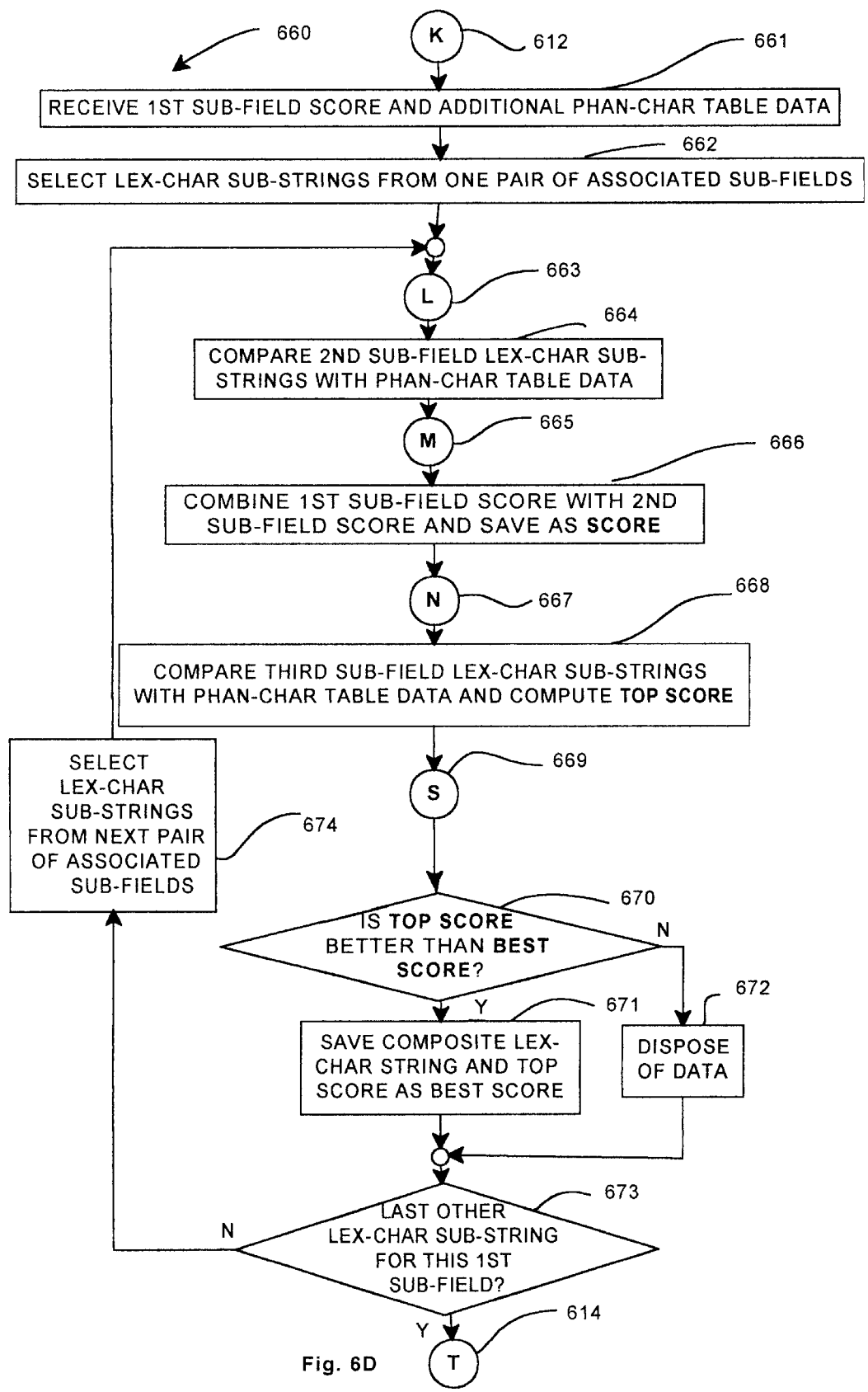

Referring now to FIG. 6D, the comparison/selection operation of block 613 begins with identifier K at block 612. Since, at this point, a first lexicon sub-string has already been selected, and a score calculated therefor, process portion 660 moves immediately to block 661. Upon entry into block 661, the process receives the score of the first lexicon sub-string and the second and third phantom character data tables (i.e. the data tables relating to the sub-fields 144 and 146 of composite field 140 on form 100 (FIG. 1)). In this case, the phantom character data tables relate to United States state abbreviations and cities respectively. The process then continues down to block 662 where a pair of second and third lexicon sub-strings which are associated with the selected first lexicon sub-string are selected. Using the example of a city/state/zip code composite alphanumeric field, the step of blocks 662 would select one city/state pair of sub-strings which represent a city and a state located within zip code area indicated by the previously selected zip code sub-string. Of course, while there may be other city/state sub-string pairs associated with the selected zip code sub-string, they will be selected later.

With one pair of associated sub-strings having been selected, the process passes through identifier L at block 663 to block 664. Here, the second phantom character data table is compared with the selected second lexicon sub-string and a score is computed therefor. The process then proceeds through identifier M at block 665 down to block 666. Here, the score associated with the selected first lexicon sub-string is combined with the score associated with the second lexicon sub-string. In this embodiment, the first lexicon sub-string score is preferably weighed more heavily than the second lexicon sub-string score so that the resulting combination reflects the increased reliability of the first sub-string data. This increase in reliability is due to the fact that, in this case, the first sub-string represents numbers (characters 0–9) as opposed to letters (52 upper and lower case characters). Next, the process passes through identifier N at block 667 and enters block 668. Here, the third lexicon sub-string is compared with the third phantom character data table and a composite score for the entire composite lexicon string is calculated. It should be understood that if the composite field consists of more than three sub-fields, further comparison stages and string score calculations would be further undertaken.

In any event, the process then passes though identifier S at block 669 and enters block 670. At block 670, a determination is made whether the composite lexicon string score is better than all previous composite lexicon string scores. If not, process essentially ends for this composite lexicon string as the composite lexicon string and its associated score are disposed of at block 672. If so, the composite lexicon string and its associated composite score are saved at block 671 and the process passes to block 673. At block 673, a determination is made whether or not the last pair of lexicon sub-strings which are associated with the selected first lexicon sub-string has been selected and evaluated. If so, the process passes back to the overall process 600 (FIG. 6A) via identifier T at block 614. Otherwise, process moves up to block 674 where another pair of lexicon sub-strings for the selected first lexicon sub-string are selected. The process then returns to block 664, via identifier L at block 663, and repeats. Of course, this portion of the process will be repeated until all of the pairs of lexicon sub-strings associated with the selected first lexicon sub-string have been selected and evaluated. When this happens and the process enters block 673 for a final time, the process will return to the overall process 600, via identifier T at block 614, as described above.

With primary reference now to FIG. 6E, the second lexicon sub-string/second phantom character data table comparison operation of block 668 (FIG. 6D) will be described in greater detail. The operation of block 668 is depicted as process portion 680 of FIG. 6E. Additionally, block 689 of process portion 680 references the character comparison sub-routine indicated at 540 of FIG. 5C. As indicated by the use of like identifiers and reference numerals, this character comparison sub-routine is the same character comparison sub-routine referenced at blocks 526, 566 and 585 of the first preferred method embodiment of the present invention.

Figure 6E:
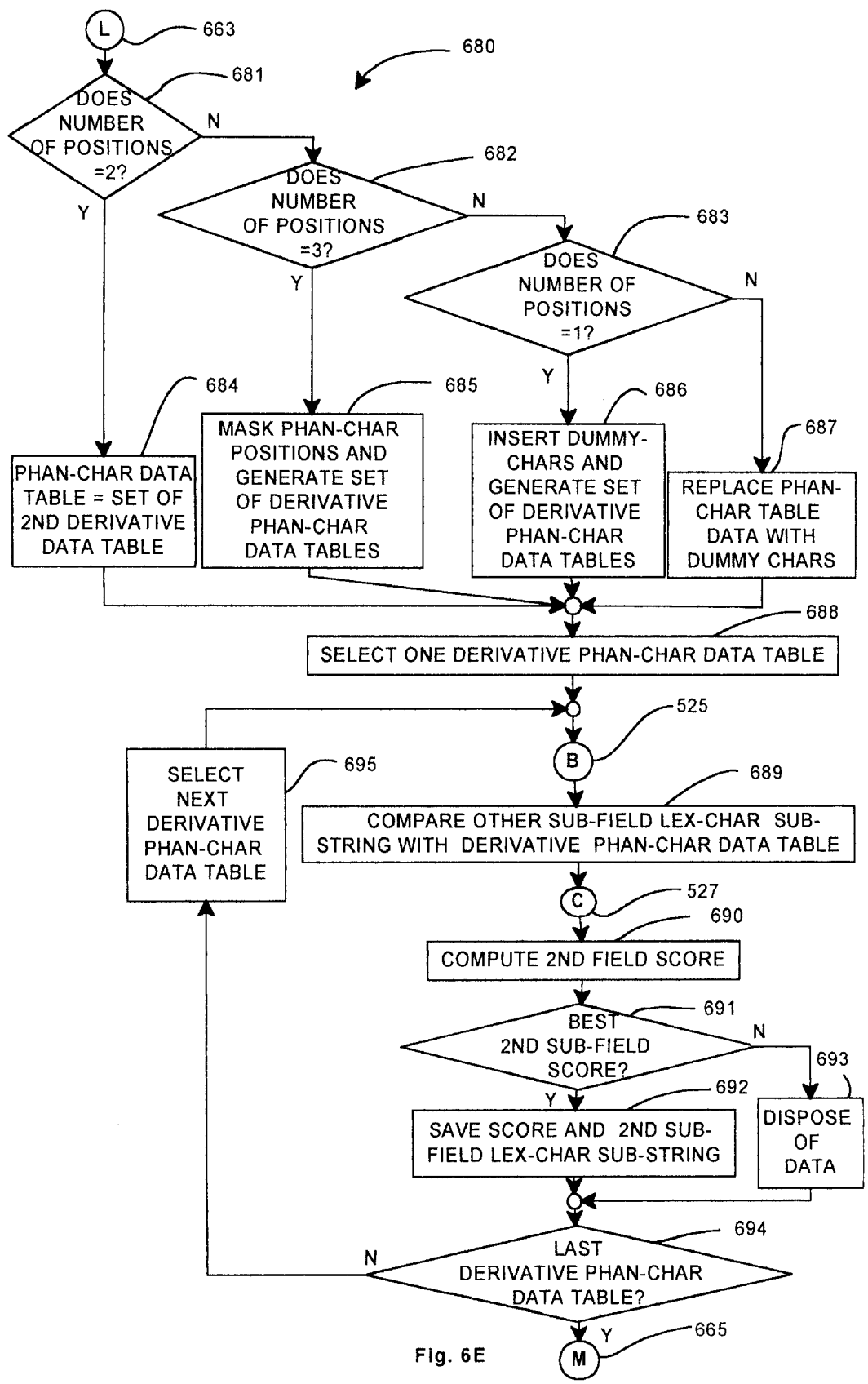

Focusing now on FIG. 6E, the second sub-string/data table comparison operation of block 664 begins with identifier L at block 663. Since a first lexicon sub-string has previously been selected, and a score calculated therefor, this information, along with the previously received second phantom character data table, is passed to block 681. Upon entry into block 681, a determination is made whether the second data table possesses two phantom character positions. It will be recognized that this embodiment checks to see if the number of character positions in the data table equals two because an ordinary United States state abbreviation will always consist of a combination of two characters. Of course, if this embodiment is applied to other types of information, the numbers mentioned herein will be adjusted accordingly.

If the data table does possess two character positions, no data table modification is required and, at block 684, the second phantom character data table is considered to be the only second derivative data table in a set of one second derivative data tables. Otherwise, the process moves to block 682 where it is determined whether the number of character positions in the second phantom character data table equals three. If so, process passes down to block 685 where a set of three second derivative data tables are generated by individually masking each character position of the second phantom character data table. In the event that the number of positions of the data table does not equal three, the process continues to block 683 where a determination is made whether or not the number of positions in the data table equals one. If so, the process passes to block 686 where a set of two second derivative data tables is generated by individually inserting a dummy character before/after the only character position in the data table. In the event that the number of positions in the data table equals neither one, nor two, nor three, the process continues to block 687 where a "dummy character data table" is created by replacing all of the table data with two dummy characters and at least one default confidence value. Thus, this "dummy data table" is considered to be the second derivative data table in a set of one second derivative data table.

Regardless of the number of positions in the phantom character data table, however, the process will continue to block 688 where one of the second derivative data tables is selected. Next, the process passes to block 689 via identifier B at block 525. Here, the selected second lexicon sub-string is compared with the selected second derivative data table and the process exits block 689 via identifier C at block 527. As indicated by the use of identifiers B and C at blocks 525 and 527, respectively, the comparison sub-routine applied in block 689 is identical to the sub-routine indicated at process portion 540 of FIG. 5C. Once the appropriate comparisons have been made, the process passes to block 691, via identifier C at block 527. Here, the saved phantom character confidence values, and possibly one or more penalty values, are mathematically combined with any saved default confidence values to produce a score for the selected second lexicon sub-string. As with the first preferred embodiment, these values are preferably decimals greater than zero and less than or equal to one. Further, the values are preferably combined using multiplication.

Next, the process continues to block 691 where the second lexicon sub-string score is tested to determine whether it is better than all previous scores for the selected second lexicon sub-string. If this score is the best score, it is saved along with the associated second lexicon sub-string at block 692 and the process continues to block 694. Otherwise, the score and its associated second lexicon sub-string are disposed of at block 693 and the process, once again, continues to block 694. Upon entry of the process into block 694, a determination is made whether all of the second derivative data tables have been selected and evaluated. If so, the process passes to process portion 660 of FIG. 6D via identifier M at block 665. If not, the process continues on through block 695 where another second derivative phantom character data table is selected. Then, the process then returns to block 689 via identifier B at block 525. The ordinary artisan will readily understand that the process will continue to repeat until all of the second derivative data tables have been selected and evaluated. Then, the process will, as described above, pass to process portion 660 of FIG. 6D via identifier M at block 665.

The third lexicon sub-string/phantom character data table comparison operation of block 668 (FIG. 6D) will now be described with primary reference to FIG. 6F. The operation of block 668 performs the lexicon string/data table matching on a character-by-character basis. Thus, while the character matching algorithm of block 668 is quite different from the comparison sub-routine 540 of FIG. 5C, both of these operations perform substantially similar functions, i.e., lexicon sub-string score calculation. The ordinary artisan will recognize process portion 700, which implements the comparison operation of block 668, as being a trinary tree recursive function. It is contemplated that alternative embodiments of the present invention could use the comparison method shown in process portion 700 in place of the other comparison sub-routine expressly described herein.

Process portion 700 begins as the process enters block 701 via identifier N at block 667. At block 701, the process initializes the third lexicon sub-string character counter i=1, and the third phantom character data table position counter j=1. Additionally, a variable "TOP SCORE" is initialized to the worst possible score value so that TOP SCORE may serve as a "local best score variable" (i.e. a variable used to remember the scope of the best third lexicon sub-string). Finally, a variable "LOCATION" is initialized to a value of identifier R of block 724. Since the process has already retrieved the appropriate third lexicon sub-strings and the third phantom character data table, the process moves directly to block 702. Here, a determination is made whether or not the current value of variable SCORE (i.e., the combination of the best first lexicon sub-string score, the best second lexicon sub-string score and, if this is not the first time the process enters block 702, the current score for the third lexicon sub-string) is the best composite score so far. If so, the process proceeds to block 705 where a determination is made whether or not the ith position of the selected third lexicon sub-string and/or the jth position of the third lexicon sub-string contain character data to compare. Restated, the ith position of the selected third lexicon sub-string and the jth position of the third data table are both tested to see if the last position of either has been reached. In the event that both do have character data to compare, the process continues to block 706 where actual comparison between the ith position of the selected third lexicon sub-string with the jth position of the third data table takes place. In the event that the result of the determinations made in both of blocks 702 or 705 is in the negative, the process passes to block 703. The further implications of this eventuality will be described below.

Figure 6F:
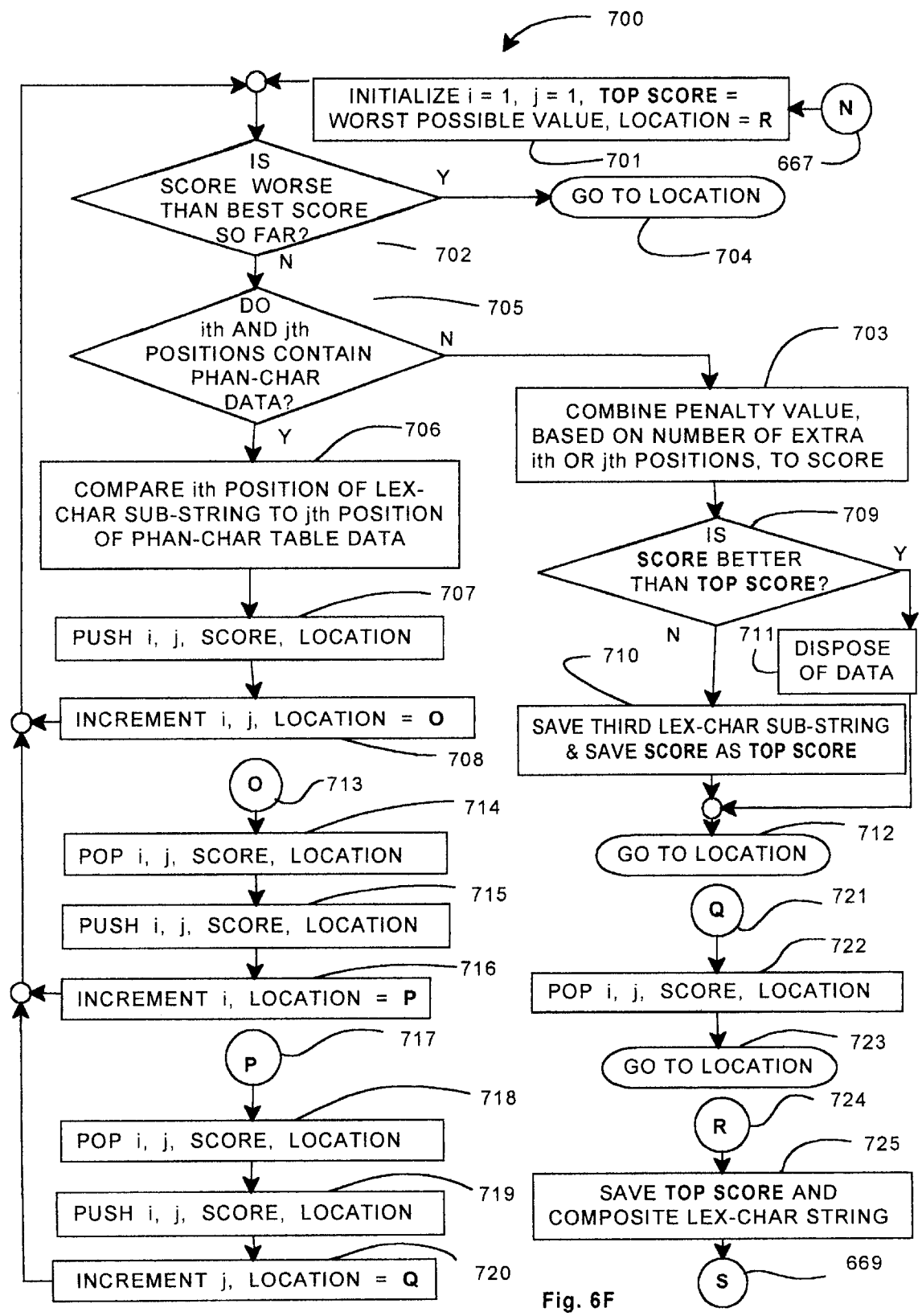

As shown in FIG. 6F, the comparison operation of block 706 is performed in a manner substantially similar to the process portion 540 shown (FIG. 5C) except that blocks 550 and 549 would not be executed and that the character positions compared vary. Thus, it will be readily appreciated that the general procedure of process portion 540 is applied to a single character in the case of comparison block 706. Before exiting block 706, the process also replaces the previous value of SCORE with the newly calculated numerical value which includes the confidence value resulting from the comparison operation of block 706. Next, the process moves to block 707 where the values i, j, SCORE and LOCATION are "pushed" onto a four variable stack (i.e., all four variables are stored in a temporary memory location for future use). Subsequently, at block 708, the values of both i and j are incremented by one and the value of LOCATION is reset to O.

Upon exit from block 708, process 700 returns to block 702 and the operations described immediately above are executed for the new ith and jth positions. Since i and j are both incremented by a value of one each time the process executes block 708, it can be seen that the third lexicon sub-string and third data table will be compared position for position until the last position of one, or both, is detected at block 705. When this occurs, the process will pass to block 703 where a predetermined penalty value, which is based on the amount by which either the number of positions remaining in the third lexicon sub-string or the number of positions remaining in the third data table exceeds the other, is combined with SCORE. The penalty value is mathematically combined with SCORE in recognition of the fact that some degree of inaccuracy exists in cases where there is extra data in either the phantom character data table or the lexicon character string. The penalty value used is preferably a decimal greater than zero and less than or equal to one. The preferred method of combination is multiplication.

Upon exit from block 703 and entry into block 709, the process compares the current composite lexicon string score (i.e. SCORE) with the previous best third sub-field score (i.e., TOP SCORE). If the current composite lexicon string score (i.e., SCORE) is better than TOP SCORE, TOP SCORE is assigned the present value of SCORE and its associated composite lexicon string is saved for possible future outputting. Otherwise, process 700 enters block 711 where SCORE and its associated phantom character data is discarded.

In either case, the process passes to the block containing the identifier which is the current value of LOCATION. It will be readily appreciated that the value of LOCATION could be any one of O, P, Q or R as assigned in blocks 708, 716, 720 or 701 respectively. In this case, since block 708 was the last of these blocks to be executed prior to entry into block 712, the current value of LOCATION equals O and the process will pass to block 713.

Next, the process moves to block 714 where the values i, j, SCORE and LOCATION are popped (i.e., retrieved from memory) from the stack. Thus, the variables i, j, SCORE and LOCATION are assigned the last (i.e., most recent) variable values pushed onto the stack (upon first execution of blocks 714 these values will be the values pushed onto the stack during execution of the pushing operation of block 707) and the process passes to block 715. At block 715, the variables are again pushed onto the stack for future use and the process moves to block 716. Here, the value of i is incremented by one, and LOCATION is assigned a value of P. Process 700 then returns to block 702 and proceeds as described above with the new values of i and LOCATION.

Upon subsequent entry into block 712, process 700 passes to the block containing the value of LOCATION, which now could be either O or P, depending on the third lexicon sub-string and third data table being compared. Of course, if LOCATION was last assigned a value in block 708, process will pass to block identifier O at block 713. If on the other hand, LOCATION was last assigned a value in block 716, the process will pass to identifier P at block 717 and continue therefrom. As the process moves from block 717 to block 718, the popping operation of block 718 is executed. This operation is identical to that of block 714 described above. Next, the process moves to block 719 where the variables are again pushed onto the stack. Next, the process moves to block 720 where the variable j is incremented and the variable LOCATION is assigned a value of Q. Process 700 then returns to block 702 and continues as described above.

When block 712 is subsequently entered, the value of LOCATION could be any of O, P, or Q. If LOCATION is equal to either of O or P, the process will continue repeating as described above until LOCATION is assigned a value of Q. When this happens and block 712 is subsequently entered, the process passes to identifier Q at block 721 and continues to block 722. Here, the popping operation of block 722 is executed and the process passes to block 723. When this occurs, the process will pass to the block containing the value of LOCATION. This could be any one of O, P, Q, or R. If LOCATION equals O, P, or Q, the process will pass to the block containing the appropriate identifier and resume as described above.

The ordinary artisan will appreciate that, eventually, all of the previously accumulated variable values which have been pushed onto the stack will also have been subsequently popped off the stack except for the initial pushing operation of block 707. It will be recalled that upon initial execution of the pushing operation of block 707, LOCATION was assigned a value of R. Thus, when the only variable values remaining on the stack are the values resulting from the initial pushing operation, the popping operation of block 722 will reassign the value of identifier R to variable LOCATION. When this happens, the process moves to block 723, and passes down to identifier R at block 724. Then, the process proceeds to block 725 where the value of TOP SCORE and its associated composite lexicon string are saved for possible outputting. At this point, TOP SCORE represents the best possible matching score for the combination of all three phantom character data tables. Finally, the process exits process portion 700 via identifier S at block 669 and reenters the overall process 660 (FIG. 6D). Thereafter, the process 660 continues, possibly repeating one or more of the above-described operations, through completion.

Those of ordinary skill in the art will recognize that process portion 700 executes the comparison/selection operation shown therein as a recursive trinary-tree matching algorithm. As shown and described, for this embodiment the matching algorithm variously compares third lexicon sub-string characters from one position with phantom character data in the corresponding position of the third lexicon sub-string as well as in positions adjacent. However, alternative method embodiments of the present invention employ variations of process portion 700 to allow character matching to occur between more distant positions. Additionally, process portion 700 can also be modified to include several of the other lexicon sub-string or data table modification techniques (e.g., lexicon sub-string masking) described herein.

Third Preferred Method Embodiment

Figure 4:
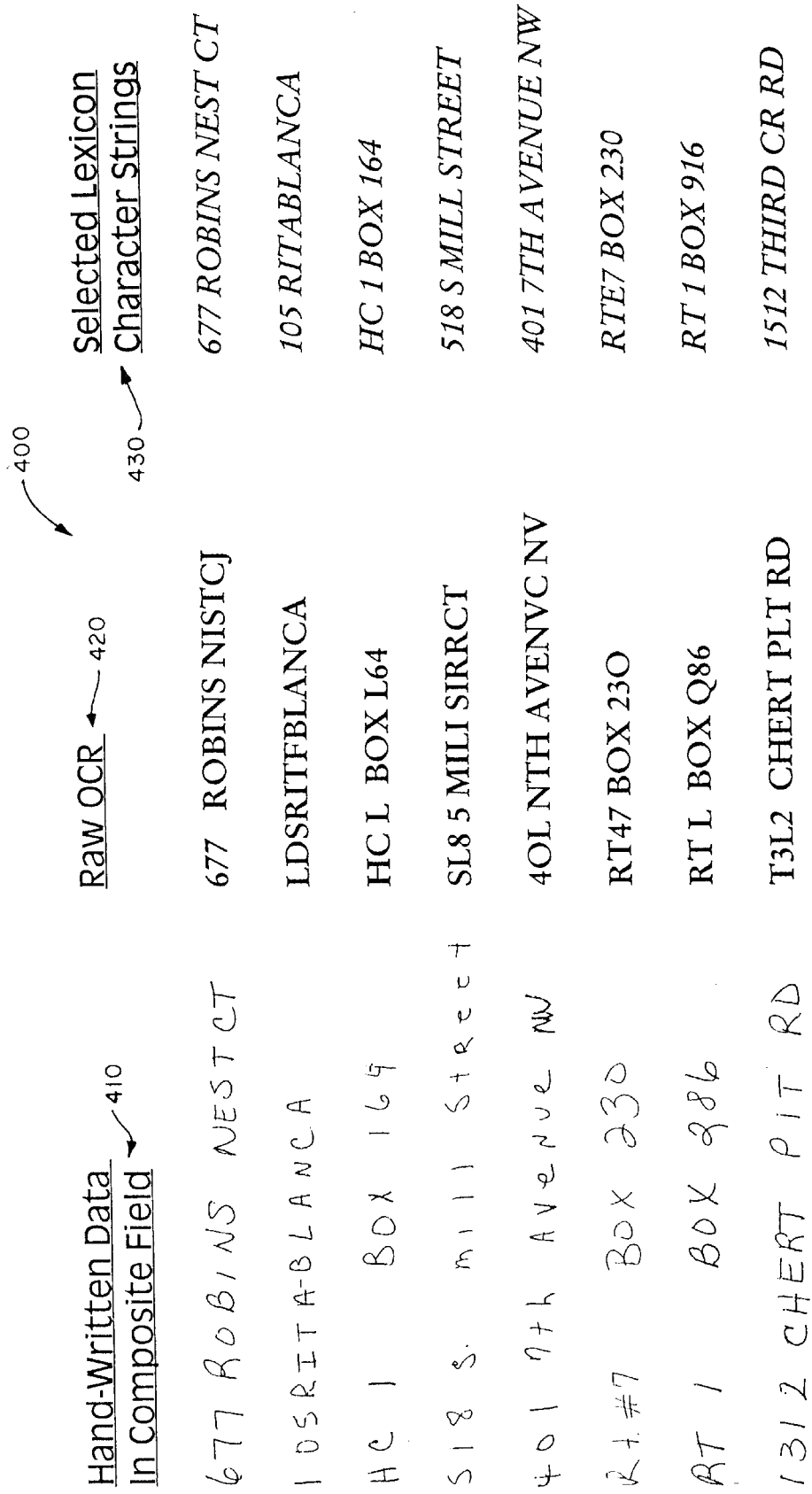
FIG. 4 is a table illustrating error correction results for a street address composite field.

Several examples of the OCR error correction results obtainable using a third preferred method embodiment of the present invention are shown in Table 400 of FIG. 4. As shown therein, column 410 contains several handprint street address lines as written by a user in a composite alphanumeric character field such as field 130 of form 100 (FIG. 1).

Column 420 contains a list of phantom character strings. These strings have been compiled in the same manner as that discussed with respect to the first and second preferred method embodiments above. Thus, column 420 essentially depicts the best possible OCR results obtainable without employing the error correction methods of the present invention.

Column 430 contains a list of amalgamated composite lexicon strings. The amalgamated composite lexicon strings have been constructed from composite lexicon character strings contained in the lexicon in accordance with a third preferred method embodiment (described immediately below) as applied to the street address lines shown in column 410. The lexicon utilized to obtain the list of amalgamated composite lexicon strings shown in column 430 contains an exhaustive list of street address information compiled from a CD-ROM publication distributed by the U.S.P.S. entitled "National ZIP+4 File." This resource was published by the National Customer Support Center and technical information therefor may be found in the U.S.P.S. "Address Information Products Technical Guide." For brevity's sake, a list of distance values associated with the amalgamated composite lexicon strings of column 430 has not been included in Table 400. As with the second preferred embodiment, however, distance values computed in this embodiment result from mathematical combination of a constant, the phantom character confidence values, possibly one or more default confidence values, and possibly one or more penalty values. Further, it is contemplated that alternative embodiments could employ lexicons containing lexicon string frequency values and that such frequency values could be included in the computation of the distance values.

The "ZIP+4 File" utilized by this method embodiment contains an exhaustive list of zip codes and associated street address ranges recognized by the United States Postal Service. The information in the ZIP+4 file is arranged in a specific format and fills over four gigabytes of computer memory. More details regarding the ZIP+4 file can be found in the U.S.P.S. "Product Information Technical Guide" which has previously been incorporated by reference. It will be appreciated by one of ordinary skill that much of the information can be removed from the ZIP+4 file and/or reorganized to facilitate utilization of the pertinent data. Most of these techniques are within the skill of the ordinary artisan. This method embodiment relies on prior preparation of the address data from the ZIP+4 file into a plurality of sub-lexicons containing street address information. Each of these sub-lexicons contains an exhaustive list of valid U.S. address ranges for a given five digit zip code where each range represents one or more valid addresses. Much extraneous matter has been removed from the ZIP+4 file during formation of the sub-lexicons and much of the remaining information has been encoded to minimize the memory needed to store the remaining data. While most of these details are not necessary to understand this embodiment of the present invention, the significant details will be described below as necessary.

Because of the type of information being processed, this method embodiment differs from those described above in a number of respects. First, it should be noted that, unlike many of the types of information processed by the above-described embodiments, street address lines often contain an intermixture of alphabetic and numeric characters within a single sub-field. To improve the accuracy of the OCR recognition engine output, character fields of this nature are processed by the recognition engine three different times: (1) once with a numeric character recognition constraint; (2) once with an alphabetic character recognition constraint; and (3) once with no character recognition constraint. Thus, each of the phantom character data tables generated by the recognition engine in accordance with this method embodiment contains three sets of three cognate pairs of phantom character data for each character detected by the recognition engine. However, the present method preferably only looks to the set of phantom character data which is of the same character type as the lexicon string character being compared at any given time. In particular, the appropriate set of three cognate pairs is selected based on the type of lexicon sub-string character to be compared.

A second way in which this method embodiment differs from those discussed above results from the manner in which the lexicon is organized. In particular, the lexicon of this embodiment contains composite lexicon character strings which define a plurality of possible values. Restated, at least some of the composite lexicon character strings represent a range of valid street addresses instead of uniquely defining a single street address. One benefit of utilizing composite lexicon character strings of this sort is that it conserves memory space and, hence, allows OCR error correction of information where the set of all possible values is enormous. As described below, this embodiment accommodates "ranged" and encoded lexicon sub-strings by utilizing modified comparison techniques and lexicon string amalgamation techniques. Another benefit of utilizing composite lexicon strings of the type described above is that it allows this embodiment to process information contained within a composite field where at least some of the sub-fields are of variable length.

The lexicon utilized by the third preferred method embodiment preferably contains street address information stored in a highly structured format. First, the composite lexicon character strings which are listed in the lexicon utilized by the third preferred method embodiment have preferably been grouped into sub-lexicons. Each sub-lexicon contains composite lexicon character strings representing street address information for addresses within a single zip code. Each sub-lexicon can, therefore, be referenced by the zip code which the addresses have in common. Thus, once this embodiment has received zip code data from some appropriate source, the process can then select the appropriate sub-lexicon and evaluate the composite lexicon character strings contained therein. Preferably, the composite lexicon character strings in all of the other sub-lexicons will, therefore, not be evaluated. It is contemplated, however, that alternative embodiments could receive multiple zip codes and thereby evaluate composite lexicon character strings contained in multiple sub-lexicons.

Second, because there are a number of different types of valid street addresses, each composite lexicon character string may represent one of a variety of street address types. These address types include general delivery, street address, post office box, rural route/highway contract, high rise, or firm. Addresses of each type are stored as lexicon entries containing a plurality of lexicon sub-strings organized in a specific format. The format information for each address type is also included in the lexicon entry to indicate the particular combination of lexicon sub-strings which form that composite lexicon character string. This information is included in the form of a pattern code which is included with the encoded lexicon sub-strings in each lexicon entry. The specific arrangement of lexicon sub-strings in the various address types is fully described in the "Address Information Products Technical Guide" with a few exceptions described below. For example, a high rise address would typically include a primary range sub-string, a pre-direction sub-string, a primary name sub-string, a suffix sub-string, a post direction sub-string, a secondary address sub-string and a secondary range sub-string which are arranged in that order (e.g. 58 North Main St. West Apt. 23). Thus, the pattern code for a high rise would indicate this arrangement of sub-strings. For ease of processing, the lexicon utilized with this embodiment employs twelve address types. These address types include both the address types supplied with the "Zip+4" file and some variations of these address types. For example, the street address type of the "Zip+4" file has been broken down into four variant address types as follows: (1) street addresses with no directional sub-strings; (2) street addresses with a pre-directional sub-string only (3) street addresses with a post-directional sub-string only; and (4) street addresses with both post- and pre-directional sub-strings. Other equally acceptable, alternative arrangements will be readily apparent to those of ordinary skill.

Third, many of the composite lexicon character strings of the lexicon utilized by this embodiment contain a plurality of alternative sub-strings for each of the lexicon sub-string positions. Thus, each composite lexicon character string actually represents a plurality of possibly valid street addresses. "Compressing" the street address data in this manner is accomplished in two different ways. In the first, each composite lexicon character string includes a code in each sub-string position which represents multiple alternative sub-strings. The encoded sub-string is used to reference a list of the possible alternative sub-strings during execution of the lexicon sub-string matching operation. For example, in a composite lexicon character string having a "secondary address" sub-string, the secondary address sub-string actually consists of a code referencing a list of all possible secondary address values including all possible variations thereof (e.g., "floor", "fl" and "flr"). When the secondary address code is encountered during sub-string matching operations, the secondary address values are in effect, decoded by retrieving the secondary address sub-strings from the list of possibly correct values. The decoded sub-strings can then be compared with the phantom character table data. It will be readily appreciated by those of ordinary skill that "compressing" the street addresses in this fashion significantly reduces the number of composite lexicon character strings and thereby improves performance of this embodiment.

The second way address information is compressed involves utilizing sub-string codes representing a range of consecutive numerals. This approach is applied to primary and secondary range sub-strings. In contrast to the above-described "compression" approach, the range codes do not reference a list of alternative sub-strings to be retrieved and compared. Rather, each range code consists of a formula code which references a set of range formulas and associated values defining the upper and lower limits of the range. These range codes are compared to the phantom character table data to determine whether the table data falls within the consecutive range of numbers which the range code represents. One of ordinary skill will readily appreciate that the "Zip+4" file is supplied with the primary and secondary range values which are already somewhat "compressed". However, the range codes of the present invention have been even further "compressed" (using conventional methods) so that each group of consecutive and valid address numbers is represented by a single range code.

Thus, many of the individual entries from the "Zip+4" file have been further "compressed" into a single ranged composite lexicon character string by encoding multiple address numbers into a single ranged value. This degree of "compression" does occasionally require that the range codes be broken down into a plurality of smaller ranges for comparison purposes during run-time. In particular, the range codes listed in each composite lexicon character string are typically compared with the phantom character table data in a number of different ways depending on the size of the range represented by the range code. Those of ordinary skill will appreciate that it is necessary to break at least some of the range codes down during comparison operations to ensure comparisons are limited to valid ranges. For example, if a given composite lexicon string represents addresses of residences for five to forty-seven Green Street, the continuous range of five to forty-seven would be broken down in three constituent parts. These parts are (1) from five to nine Green Street; (2) from ten to thirty-nine Green Street; and (3) from forty to forty-seven Green Street.

Various comparison formulas which will be utilized during comparison operations for a number of range types are illustrated in Table 1200 of FIG. 8. As shown therein, single digit ranges (e.g., a range of 1–7) will be evaluated in accordance with the formula shown to the right of the ordered pair (1, 1). Additional sets of formulas are also shown for cases where the range extends from one to two digits (see (1, 2)), one to three digits (see (1, 3)), one to four digits (see (1, 4)), and three to four digits (see (3, 4)). Those of ordinary skill in the art will readily understand how to extend the concepts illustrated in Table 1200 of FIG. 8 to include all possible numeric ranges where the low and high range limits can be from one to five digits in length.

The use of the street address lexicon of the type described above results in at least one other significant difference between this method embodiment and the method embodiments described above. Specifically, the character strings selected and outputted in accordance with this embodiment are unique in that they consist of an amalgamation of alternative lexicon sub-strings for each sub-string position of a composite lexicon character string in the lexicon. In essence, the amalgamated composite lexicon string is formed by combining the best alternative sub-string from each sub-string position of a composite lexicon character string. In light of the foregoing, those of ordinary skill will appreciate many similarities and differences between the following method and those described above. For example, such an amalgamated composite lexicon string is still a composite lexicon character string which has been selected from a lexicon of character strings in a manner similar to those described above. Such an amalgamated composite lexicon string is distinct from the previously described composite lexicon character strings, however, in that one or more of the sub-strings in an amalgamated composite lexicon string have been selected from a number of possible alternative sub-strings.

Figure 7A:
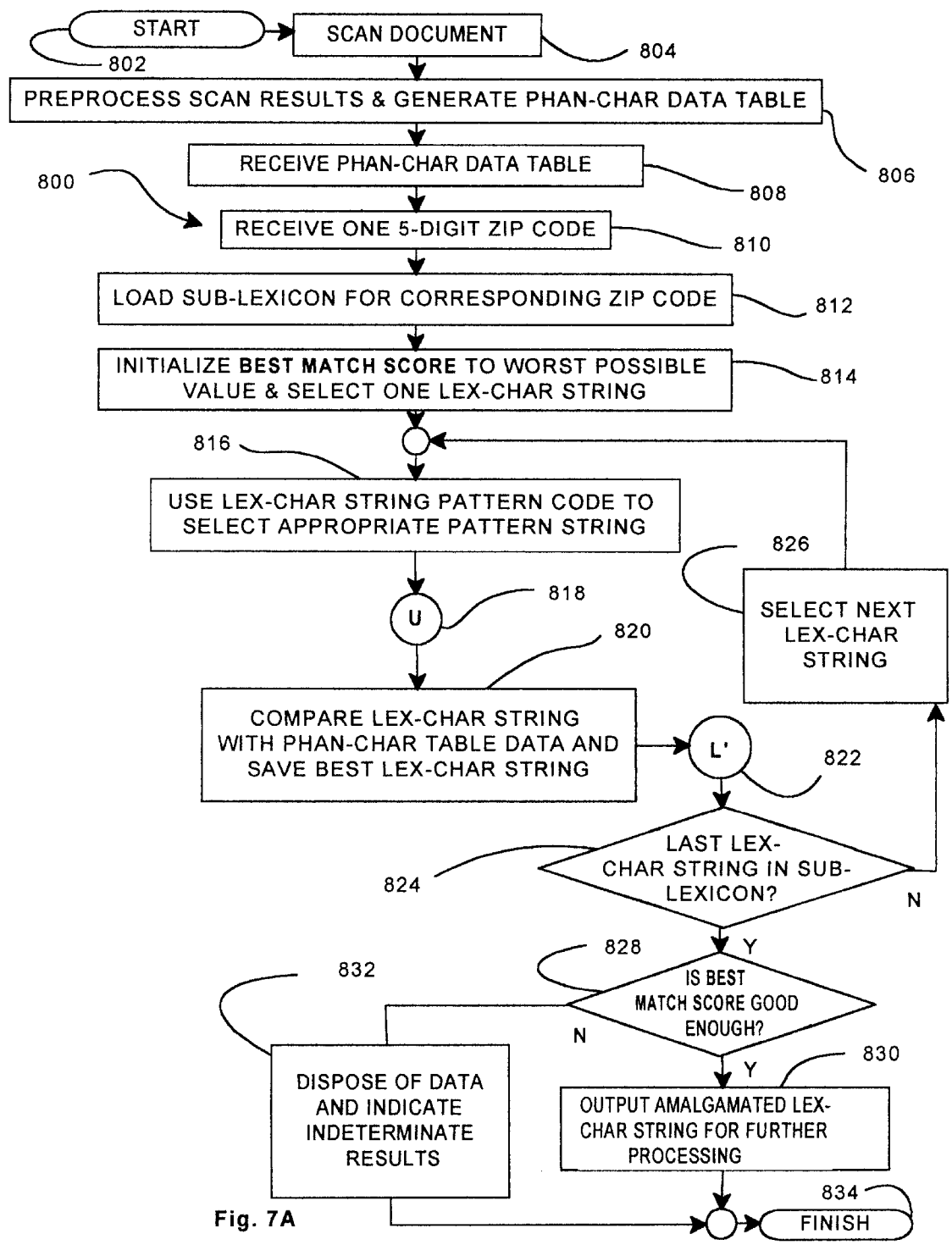
FIG. 7A is a high level flow chart of a third preferred method embodiment for correcting OCR errors of a composite alphanumeric character field.

With particular reference now to FIG. 7A, a third preferred embodiment of the present invention is shown at 800. This embodiment is directed to correcting OCR errors occurring during scanning and recognition of composite alphanumeric character fields such as composite field 130 in FIG. 1. While this embodiment is particularly well suited for correcting OCR errors occurring during recognition of street address lines, it will be readily appreciated that the methods described herein are directly applicable to many other types of information. It should be noted that FIG. 7A is a high level flow chart of the entire third preferred method embodiment and that the portions thereof between identifiers U and L' will be described in greater detail below.

As may be seen from FIG. 7A, the process 800 begins at block 802 and thereafter proceeds to block 804 which represents the step of scanning a document, such as form 100 of FIG. 1, containing user-written information in the form of a composite alphanumeric character string. This step results in bit-map image data of the document being processed which can then be converted into distinct alphanumeric characters by a recognition engine as shown at block 806. This results in one or more tables of phantom character data for each sub-field of composite field 130 (FIG. 1) wherein each table contains a numeric part, an alphabetic part and an alphanumeric part. As with the first two preferred method embodiments, each part of these phantom character data tables preferably consists of three cognate pairs of phantom characters and associated confidence values for each character position. However, in this embodiment, the three individual portions of the phantom character data table are created by constraining the type of characters which the recognition engine is allowed to output. Thus, the data tables are formed in three distinct portions containing either numeric, alphabetic, and alphanumeric data in each part. Nonetheless, it will be appreciated by those of ordinary skill that this is a feature of the preferred embodiment and not necessary for the present invention to operate.

After conversion of the bit-map image data, the phantom character data tables are received at block 808 and the process moves to block 810. Here, the preferred embodiment receives a character string which has been previously selected and represents a five-digit zip code. The zip code string can be selected by and received from a wide variety of sources including one or more of the previously described method of embodiments. Regardless of the source, however, the zip code string is used to select a sub-lexicon in which each of the composite lexicon character strings in the sub-lexicon constitutes a street address within the selected zip code. It will be readily appreciated that arranging and utilizing the lexicon entries in this manner is a preferred feature which greatly reduces the number of lexicon strings processed, thereby improving the efficiency of this method embodiment.

Once the appropriate zip code has been received, the process may pass to block 812 where the appropriate sub-lexicon is loaded for processing. The process then moves to block 814 where one composite lexicon character string is selected for processing and a variable "BEST MATCH SCORE" is initialized to the worst possible value. The process then continues to block 816 where the pattern code associated with the composite lexicon character string is used to determine the type of address this composite lexicon character string represents (e.g. high rise, general delivery, etc.). In particular, the process uses the pattern code to determine the particular arrangement of lexicon sub-strings which form the selected composite lexicon string. Using this information, process 800 can then pass to block 820, via identifier U at block 818, to compare the various lexicon sub-strings of the currently selected composite lexicon character string with phantom character table data in a number of different ways. As will be described below, the comparison operation of block 820 results in the generation of an amalgamated composite lexicon string and an associated score. Since the composite lexicon character strings in the sub-lexicon typically include a plurality of sub-strings for at least some of the lexicon sub-string positions, the amalgamated composite lexicon string is found by selecting and combining the best alternative lexicon sub-strings for each lexicon sub-string position. If this amalgamated composite lexicon string matches the phantom character data better than all previous amalgamated composite lexicon strings in this sub-lexicon, it is saved for possible future outputting. Additionally, the score generated for this amalgamated composite lexicon string is saved as the variable BEST MATCH SCORE.

Once the comparison/saving operation of block 820 is performed, the process passes to block 824 via identifier L' at block 822. Here, a determination is made whether the composite lexicon character string evaluated immediately above was the last composite lexicon character string in the sub-lexicon. If not, the process selects another composite lexicon character string at block 826 and returns to block 816 and continues therefrom. It will be readily appreciated by those of ordinary skill that the process will continue as described above until the final composite lexicon character string of this sub-lexicon has been selected and evaluated. When this occurs and the process enters block 824, the process will then pass to block 828. Here a determination is made whether the amalgamated composite lexicon string which has been saved as the best matching string is sufficiently accurate that it should be outputted for further processing. If so, the amalgamated composite lexicon string is outputted for further processing at block 830. From there, the process terminates at block 834. Otherwise, the match results will be disposed of and a signal indicating indeterminate results will be produced at block 832. This determination results from a comparison between a distance value, which is based on the resulting numeric value associated with the selected amalgamated composite lexicon string, and some predetermined threshold value. Once a signal indicating indeterminate results is produced, the process terminates at block 834.

The lexicon character string/phantom character data table comparison and saving operations of block 820 (FIG. 7A) will now be described in greater detail with primary reference to FIG. 7B. The operation of block 820 is depicted as process portion 840 of FIG. 7B. Additionally, blocks 876, 883, and 887 of process portion 840 reference comparison operations which are shown and described in still greater detail further below. It will be appreciated that each time process portion 840 is fully executed one composite lexicon character string will have been fully compared with the phantom character table data.

Figure 7B:
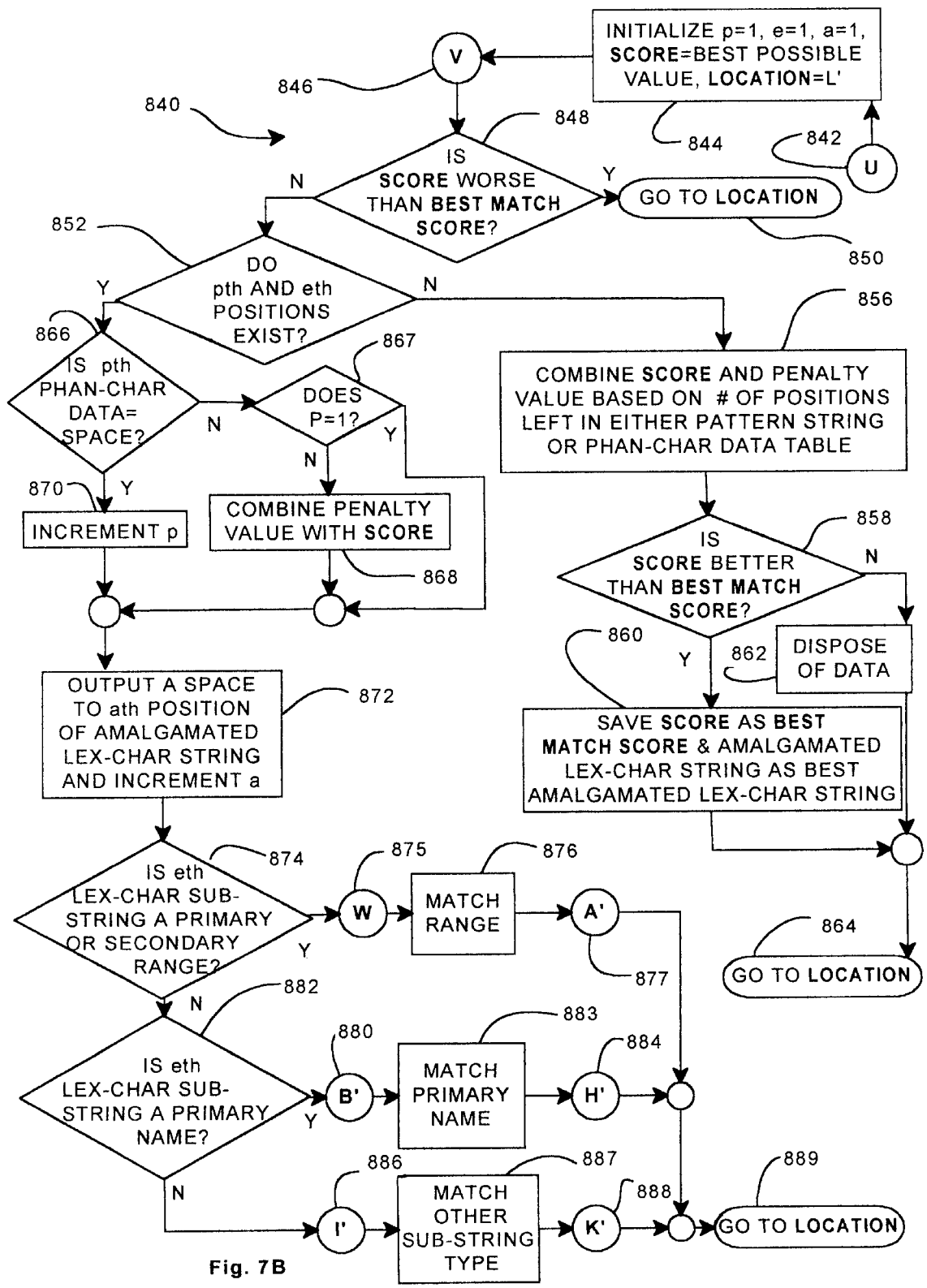
FIGS. 7B–7H are low-level flow charts illustrating various steps shown in the flow chart of FIG. 7A in greater detail.

Focusing now on FIG. 7B, the lexicon string/phantom character data table comparison operation begins with identifier U and block 842. Since at least one phantom character data table has previously been received and a composite lexicon character string has been selected, the process moves to block 844. At block 844, the process initializes a number of values as follows: (1) phantom character data table counter p=1; (2) lexicon sub-string counter e=1; (3) amalgamated lexicon character string position counter a=1; (4) variable "SCORE" is initialized to the best possible value; and (5) variable "LOCATION" is initialized to a value of identifier L' of block 822. The process then passes to block 848, via identifier V of block 846, where a determination is made whether the variable SCORE is worse than the best matching score so far. Since the variable BEST MATCH SCORE has previously been initialized to the worst possible value in block 814 (FIG. 7A), at least initially, the process then moves to block 852. Here, a determination is made whether both of the (1) pth phantom character table data position and the (2) eth lexicon sub-string exist and can, therefore, contain data which can be compared. If not, the process continues to block 856 and continues therefrom.

Since the overall process 800 (FIG. 7A) typically passes through block 852 multiple times for each composite lexicon character string evaluated, at least one of (1) the phantom character data table or (2) the lexicon character string will eventually fail to contain further information. When this happens, blocks 856 et seq. are executed. However, since this is the first time block 852 is executed, the first lexicon sub-string and the first position of the phantom character data table will be assumed to have information. When this is the case, the process will pass to block 866. Here, a determination is made whether the data in the pth phantom character data table position is a space. If so, the process continues to block 870 where the value of p is incremented. Otherwise, the process proceeds to block 867 where a determination is made whether the value of p is equal to one. If p does not equal one, a predetermined penalty value will be combined with the variable SCORE at block 868. Regardless of the result of the determination made at block 867, however, the process will pass to block 872 and continues therefrom.

The process then enters block 872 where a space is concatenated with whatever may presently exist of an amalgamated composite lexicon string. It will be appreciated that the step of block 872 serves to place a space between each lexicon sub-string of the amalgamated composite lexicon string as it is built from the selected alternative lexicon sub-strings. Further, the amalgamated composite lexicon string position counter a is incremented at block 872. Then the process enters block 874 where it is determined whether the eth lexicon sub-string represents a primary or a secondary range. If so, the process passes through identifier W at block 875 and enters block 876. Here, the lexicon sub-string is compared with the phantom character table data and the process passes to identifier A' at block 877. If the lexicon sub-string does not represent a primary or secondary range, the process then passes to block 880. Here, it is determined whether the eth lexicon sub-string represents a primary name. If so, the process passes to block 883 via identifier B' at block 882. Here, the lexicon sub-string is compared with the phantom character table data and the process passes to identifier H' at block 884. If the lexicon sub-string does not represent a primary name, the process passes to block 887 via identifier I' of block 886. At block 887, the lexicon sub-string is compared with the phantom character table data and the process passes to identifier K' at block 888.

It will be readily appreciated by the ordinary artisan that, regardless of which path the process takes, the process will eventually enter block 889 where the process will pass to the identifier which is the current value of the variable LOCATION. It should be noted that, in addition to its originally assigned identifier value of L', the value of the variable LOCATION could assume any one of the identifier values Z, G' or J' as the process executes the operations of one of blocks 876, 883 or 887. Thus, upon entry into block 889, the process may pass to any one of identifiers L' of block 822 (FIG. 7A), Z of block 920 (FIG. 7C), G' of block 978 (FIG. 7E), or J' of block 1078 (FIG. 7H) and continue therefrom.

As will be described in greater detail below, as the process passes through one of blocks 876, 883, or 887, it will enter various blocks which will pass the process to identifier V at block 846. Each time it does so, the process will pass through blocks 848 and 852 where the conditions described therein will be tested. When either (1) the composite lexicon character string has no more sub-strings to be tested; or (2) there is no character data in the pth phantom character data table position, the process will pass to block 856.

Upon entry into block 856, the present value of the variable SCORE will be combined with a penalty value which is based on either of (1) the number of positions left in the phantom character data table; or (2) the number of sub-strings left in the composite lexicon character string. Thus, the variable SCORE now represents a complete score for the particular amalgamated composite lexicon string being generated. The process then passes to block 858 where a determination is made whether the present value of SCORE is better than the value of BEST MATCH SCORE. If so, the value of variable SCORE is saved into the variable BEST MATCH SCORE. Additionally, the current amalgamated composite lexicon string is saved for possible future outputting. If the value of SCORE is not better than the value of BEST MATCH SCORE, the process passes to block 862 where the current value of SCORE and its associated amalgamated composite lexicon string are disposed of. Regardless of the determination made in block 858, the process will pass to block 864 where the process will pass to the identifier which is the current value of the variable LOCATION. Since this may be any one of Z, G', J', or L', the process will move to the appropriate identifier and continue therefrom.

Figure 7C:
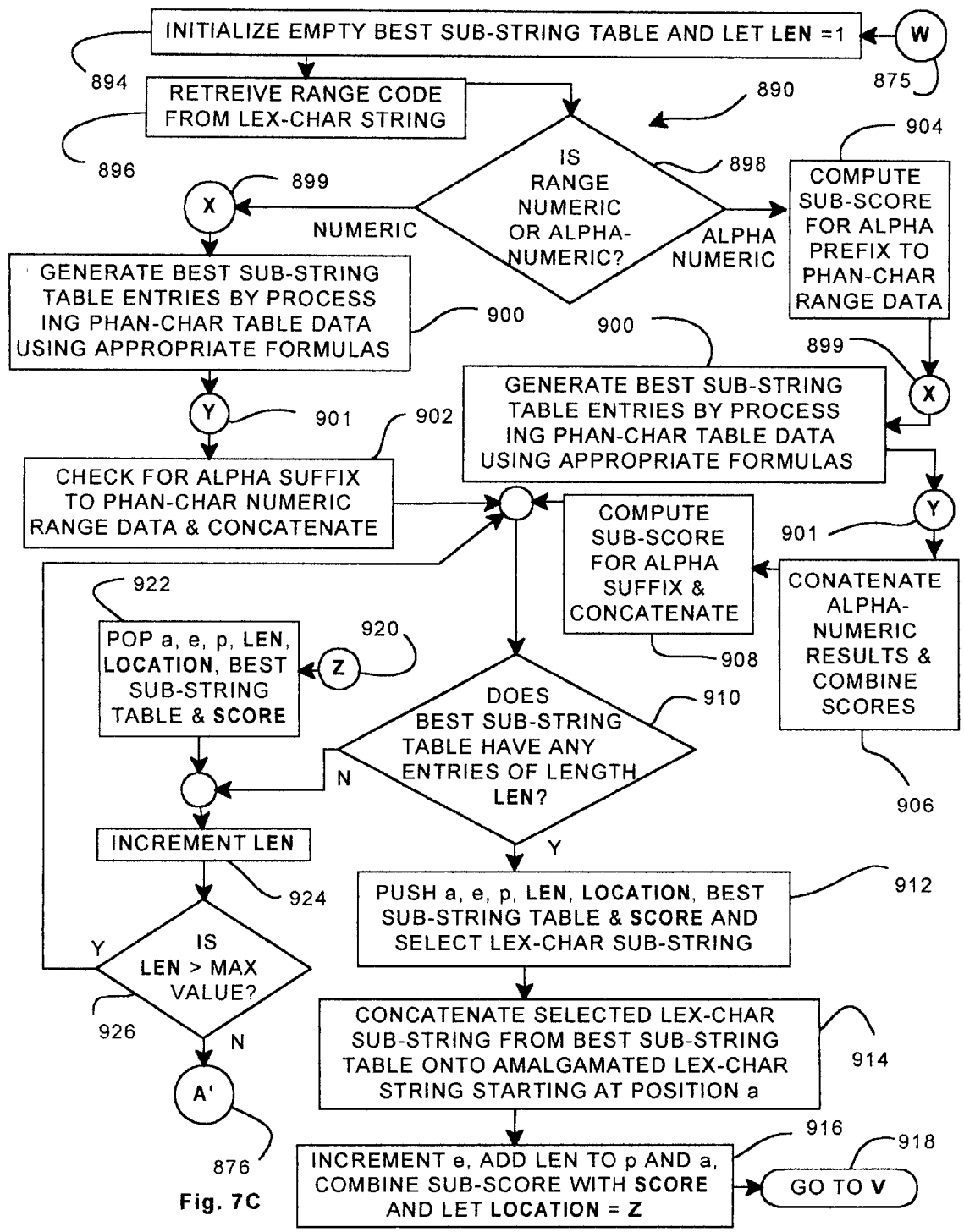

Referring now to FIG. 7C, the range matching operation of block 876 is depicted in greater detail as process portion 890. Process portion 890 begins as the process enters identifier W at block 875. Since the values of p,e,a, SCORE, LOCATION, and BEST MATCH SCORE and a previously selected lexicon character string will be passed into process portion 890, the process proceeds directly to block 894 where a best sub-string table will be initialized and a sub-string length counter "LEN" will be initialized to a value of one. The best sub-string table will serve as a temporary memory storage for the alternative lexicon sub-strings during evaluation thereof so that the best sub-string of each length can be selected and stored in the best sub-string table. Eventually, the entries in the best sub-string table will be compared so that the best sub-string of all of the best sub-string table entries can be selected.

Once the operation of block 894 has been executed, the process passes to block 896 where the range code from the composite lexicon character string is retrieved. As mentioned above, this range code preferably represents a plurality of consecutive address numbers which can be compared with the phantom character table data in accordance with a number of formulas such as those shown in Table 1200 (FIG. 8). After executing block 896, the process passes to block 898 where a determination is made whether the range code indicates that the range is numeric or alphanumeric. If the range is numeric, the process passes to block 900 via identifier X at block 899. Here, the phantom character table data is compared with the range code in various ways and the best sub-string table is completed using the best sub-string matches and an associated SCORE for range values of each length. The process then continues to block 902 via identifier Y at block 901. Here, the process checks for the possible presence of an alphabetic suffix to the numeric phantom character range data and, if appropriate, concatenates the alphabetic suffix onto the appropriate best sub-string table entries. The process then passes to block 910.

If, in block 898, it is determined that the range code is alphanumeric instead of numeric, the process passes to block 904. If the range data includes an alphabetic prefix, a sub-score is computed for the prefix to the phantom character range data. The process moves to block 900, via identifier X at block 899, where the best sub-string table is completed in the same manner as described above with respect to numeric range codes. The process will then pass to block 906, via identifier Y of block 901, where the alphabetic prefix is combined with the numeric portions of the range code contained in the best sub-string table. Also, resulting scores are generated for each of the modified best sub-string table entries. Next, the process passes to block 908 where, if applicable, an additional sub-score is computed for the alphabetic suffix of the alphanumeric range. If applicable, the alphabetic suffix is then concatenated onto the present best sub-string table entries. Additionally, the alphabetic sub-score is combined with the scores presently associated with each of the best sub-string table entries. At this point, the process will have completed the best sub-string table regardless of whether the range code represents a numeric range or an alphanumeric range.

With the best sub-string table completed the process then continues to block 910. At block 910 it is determined whether the best sub-string table has any entries of length LEN. If not, the process moves to block 924 where the value of LEN is incremented. Next, the process moves to block 926 where LEN is tested to ensure that it is not greater than some predetermined maximum value. In the case of an address range the maximum value will be five. If LEN is greater than the maximum value the process passes back to process portion 840 (FIG. 7B) via identifier A' at block 876 and continues therefrom. Otherwise, the process returns to block 910 and continues therefrom.

If the result of the determination made in block 910 is in the affirmative, the process passes to block 912. Here, the values of a, e, p, LEN, LOCATION, score and the entire best sub-string table are saved into memory by pushing them onto a stack. Additionally, the lexicon sub-string of length LEN is selected from the best range table. The process then moves to block 914 where the selected lexicon sub-string is concatenated with whatever may presently exist of an amalgamated composite lexicon string beginning at position a. Next, the process moves to block 916 where the following occurs: (1) the value of e is incremented; (2) the value of LEN is added to both p and a; (3) the sub-score associated with the selected lexicon sub-string is combined with variable SCORE; and (4) the value of LOCATION is set to identifier Z. It will be readily appreciated that the effect of the operations of blocks 910–916 is to save the accumulated comparison results generated thus far for the selected lexicon character string. This enables the process to evaluate the remainder of the composite lexicon character string while still allowing the process to return to this point in the overall comparison operation in the future.

With the comparison results saved in blocks 910–916, the process then moves to block 918 where it passes to identifier V at block 846 (FIG. 7B) and continues on therefrom. In essence, then, the process will continue to evaluate the remainder of the lexicon sub-string in the previously selected composite lexicon character string, if any, based on the values saved in block 912 until all of the possibilities have been exhausted. When this occurs the process will eventually arrive at one of blocks 850, 864 or 889 where the process will pass to the present value of variable LOCATION. Since LOCATION was previously assigned a value of identifier Z of block 920 at block 918, the process will pass to block 920 and continue therefrom.

Once the process enters block 920 it moves directly to block 922. Here the last values of a, e, p, LEN, LOCATION, SCORE and the entire best sub-string table are popped off of the stack. Thus, the comparison process is effectively reset so that the process can continue to perform other comparisons starting with the previously saved comparison results. Then the process moves to block 924 and continues therefrom as described above. It will be readily appreciated that the overall effect of the operations of blocks 910–920 is to evaluate all possible lexicon sub-string combination for the remaining lexicon sub-string positions of the selected composite lexicon character string based on each entry in the best sub-string table. When the sub-string length counter LEN finally becomes greater than the predetermined maximum value and the process enters block 926, the process essentially terminates for this lexicon sub-string position as the process exits process portion 890 and re-enters process portion 840 via identifier A' at block 876.

Figure 7D:
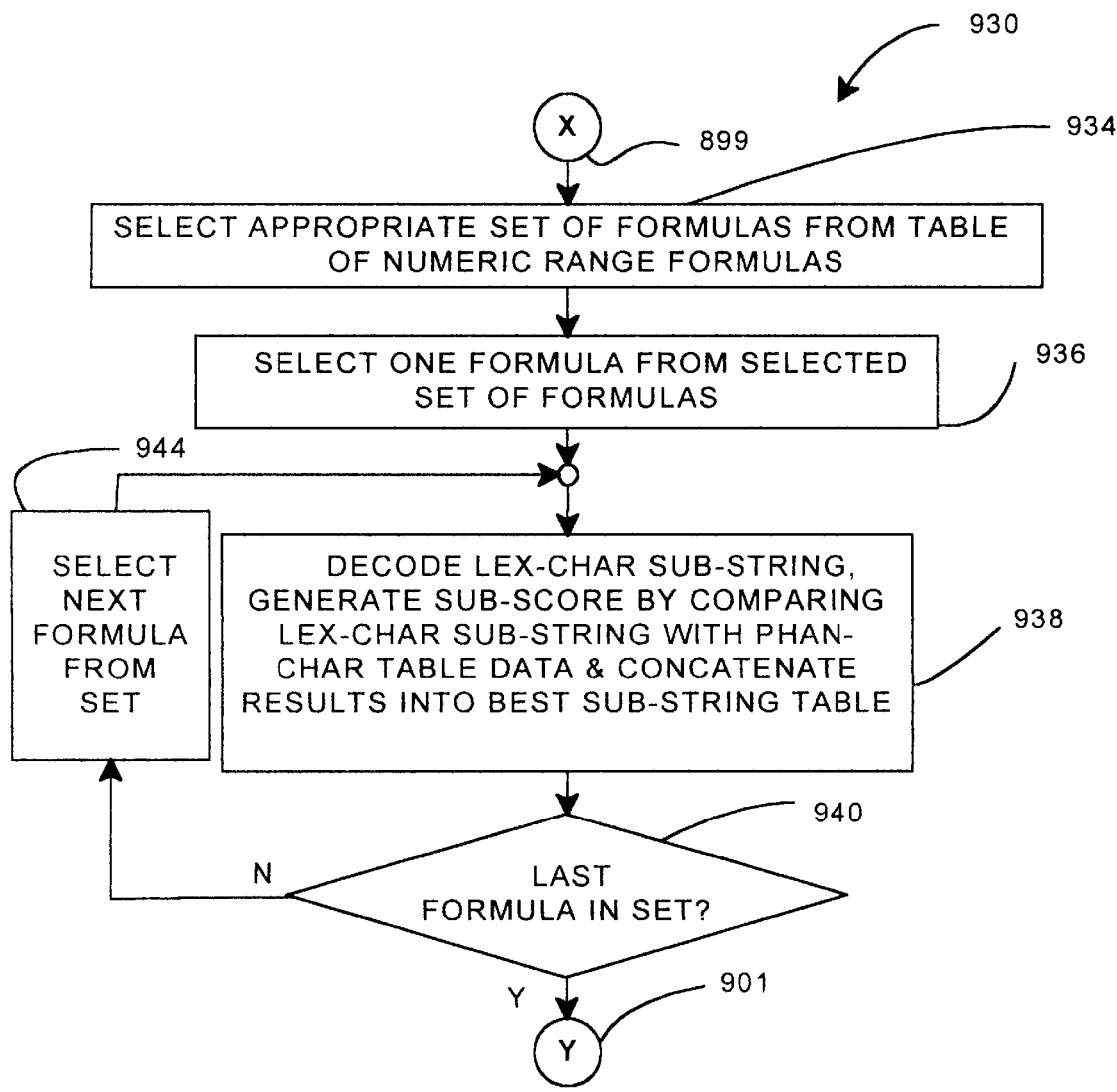

Referring primarily now to FIG. 7D, the operation of block 900 (FIG. 7C) is shown in greater detail at process portion 930. The result of this operation will be the generation of the numeric portion of the best sub-string table. The sub-string generation operation begins at identifier X of block 899. The process then passes to block 934 where the appropriate set of numeric range code formulas, such as one of those depicted in Table 1200, are selected. Next, the process enters block 936 where one numeric range formula is selected from the set of previously selected numeric range formulas. The process then continues to block 938. Here, a lexicon sub-string is decoded using the previously selected numeric range formula and a sub-score for the lexicon sub-string is generated by comparing the lexicon sub-string with the phantom character table data. The sub-score is associated with the lexicon sub-string and the results are placed into the best sub-string table. If the range is an alphanumeric range having an alphabetic prefix, the results of comparing the numeric portion of the lexicon sub-string with the phantom character table data are concatenated onto the alphabetic prefix and placed into the best sub-string table. The process then continues to decision block 940 where a determination is made whether the selected numeric range formula is the last numeric range formula in the set. If so, the process passes back to the process portion 890 (FIG. 7C) via identifier Y at block 901 and continues therefrom. If there are other numeric range formulas in the set, the process passes through block 944 where another numeric range formula is selected from the set. The process then continues to block 938. One of ordinary skill will readily appreciate that this process repeats until the last formula is selected from the set of formulas and the process enters block 940. When this occurs, the process re-enters process portion 890 via identifier Y at block 901.

Figure 7E:
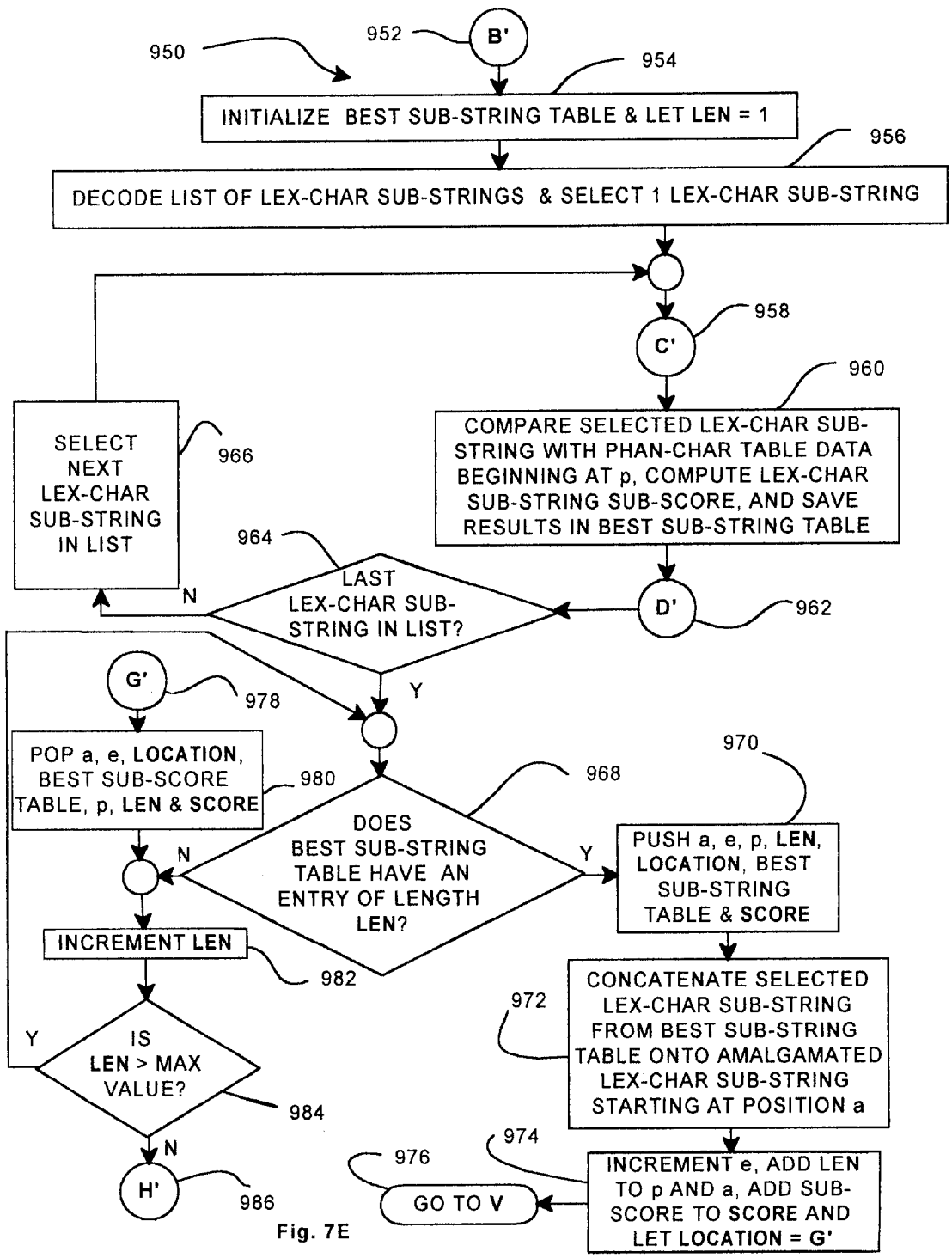
Figure 7F:
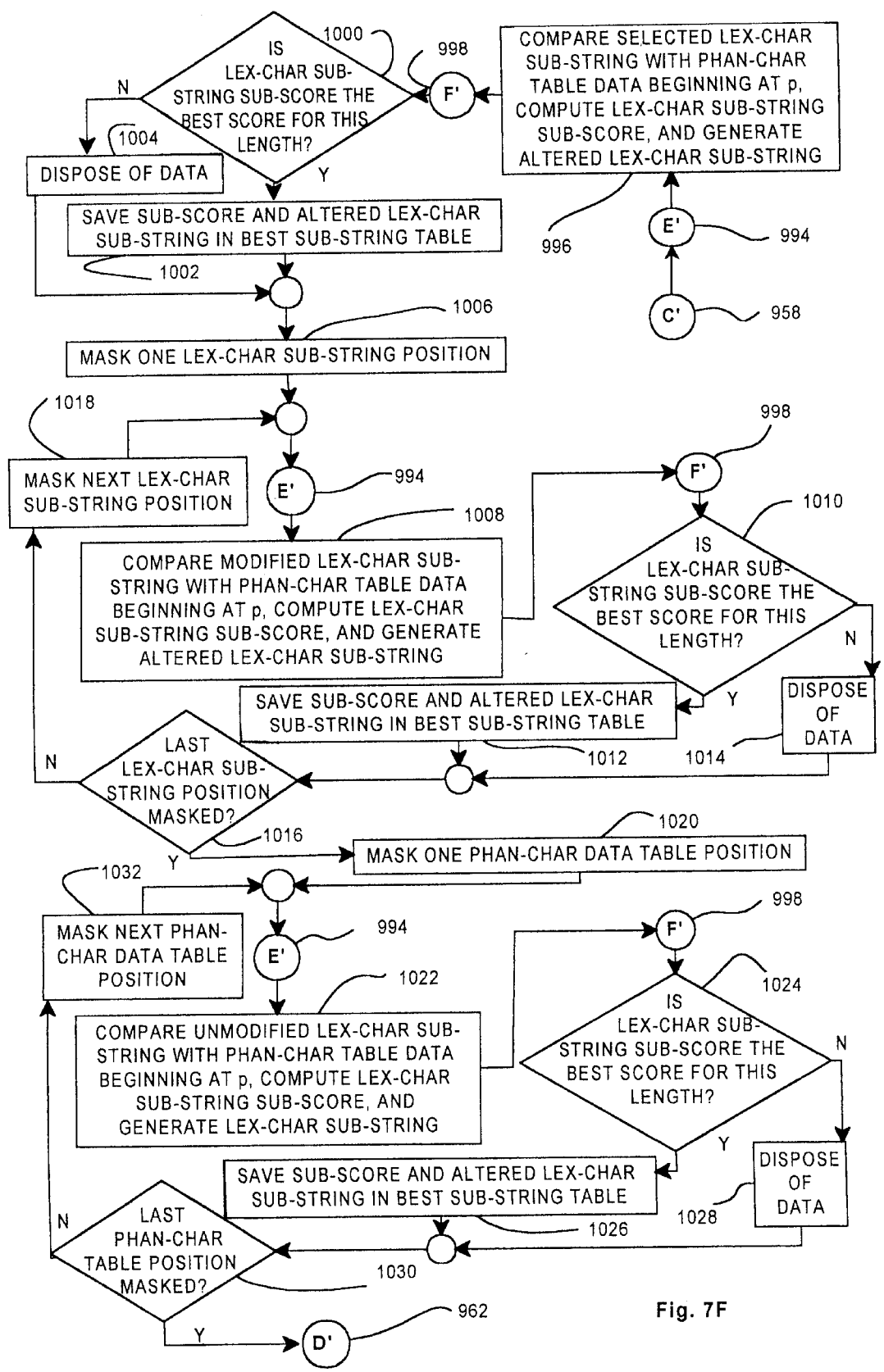
Figure 7G:
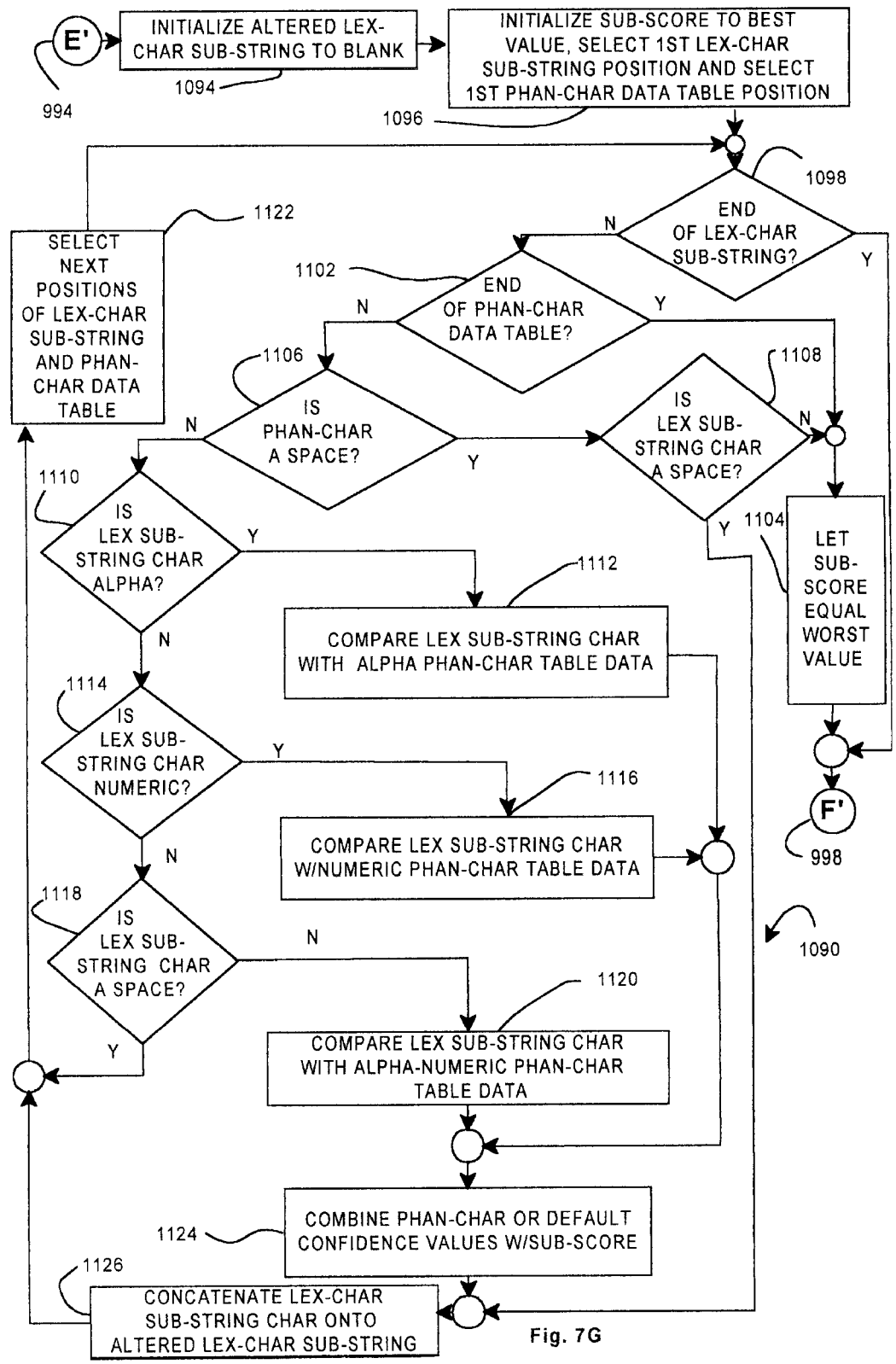

With reference now to FIGS. 7E–7G, the match primary name operation of block 883 (FIG. 7B) will now be described in greater detail.

While execution of the operation of block 883 is fully described in process portion 950 (FIG. 7E), the comparison operation of block 960 shown therein is covered in further detail in process portion 990 of FIG. 7F. The comparison operations of blocks 996, 1008 and 1022 (FIG. 7F) are, in turn, shown in every greater detail in process portion 1090 (FIG. 7G).

Referring now to FIG. 7E, the match primary name operation of block 883 begins with identifier B' at block 952. Overall process 800 enters process portion 950 with values of p, e, a, SCORE, BEST MATCH SCORE having been assigned and with a previously selected composite lexicon string. Thus, the process continues directly to block 954 where the best sub-string table is initialized as a blank table and the best sub-string table position counter LEN is initialized to a value of one. Next, the process moves to block 956 where the list of primary name lexicon sub-strings is decoded and where one lexicon sub-string is selected from the list of decoded lexicon sub-strings. The decoding procedure applied to primary name lexicon sub-strings is preferably slightly different from the decoding procedures for the other lexicon sub-strings described in the specification. The primary difference between the decoding procedures results from the fact that primary name lexicon sub-strings are preferably only partially encoded. Specifically, if a portion of the street name can be commonly abbreviated (e.g. Saint, as in Saint Paul), that portion of the lexicon sub-string includes a code which references a list of the possible abbreviations. On the other hand, if all or a portion of the street name is not commonly abbreviated (e.g. Algonquin), that portion of the lexicon sub-string does not reference any list of alternatives, but rather, contains the character data itself. This is to be contrasted with the lexicon sub-strings discussed above which consisted of either a range code or an encoded list of alternative sub-strings (i.e. no actual character strings at all).

After one, possibly partially decoded, lexicon sub-string has been selected, the process passes to block 960 via identifier C' at block 958. Here, the process compares the selected lexicon sub-string with the phantom character table data beginning at position p. Further, a lexicon sub-string sub-score is generated and associated with the lexicon sub-string. Finally, if necessary, a space may be removed from the lexicon sub-string if the corresponding position in the phantom character data table does not contain a space. Next, the process continues to block 964 via identifier D' of block 962. Here, if applicable, a determination is made whether the lexicon sub-string evaluated above is the last lexicon sub-string in the previously decoded list of lexicon sub-strings. If not, the process passes up to block 966 where another lexicon sub-string is selected and evaluated according to the operation of block 960. When the last lexicon sub-string has been evaluated and the process enters block 964, the process then passes to block 968.

At block 968 it is determined whether the best sub-string table has any entries of length LEN. If not, the process moves to block 982 where the value of LEN is incremented. Next, the process moves to block 984 where LEN is tested to ensure that it is not greater than some predetermined maximum value. In this preferred method embodiment the maximum value has been selected to be thirteen. If LEN is greater than the maximum value the process passes back to process portion 840 (FIG. 7B) via identifier H' at block 884 and continues therefrom. Otherwise, the process returns to block 968 and continues therefrom.

If, on the other hand, the result of the determination made in block 968 is in the affirmative, the process passes to block 970. Here, the values of a, e, p, LEN, LOCATION, SCORE and the entire best sub-string table are saved into memory by pushing them onto a stack. Additionally, the lexicon sub-string of length LEN is selected from the best sub-string table. The process then moves to block 972 where the selected lexicon sub-string is concatenated onto with whatever may presently exist of an composite amalgamated lexicon string beginning at position a. Next, the process moves the block 974 where the following occurs: (1) the value of e is incremented; (2) the value of LEN is added to both p and a; (3) the sub-score associated with the selected lexicon sub-string is combined with variable SCORE; and (4) the value of LOCATION is set to identifier G'. It will be readily appreciated that the effect of the operations of blocks 968–974 is to save the accumulated comparison results generated thus far for the selected lexicon character string.

The process then moves to block 976 where it passes to identifier V at block 846 (FIG. 7b) and continues on therefrom. In essence, then, the process will continue to evaluate the remainder of the lexicon sub-strings of the selected composite lexicon character string, if any, based on the values saved in block 960 until all of the possibilities have been exhausted. When this occurs the process will eventually arrive at one of blocks 850, 864 or 889 where the process will pass to the present value of variable LOCATION. Since LOCATION was previously assigned a value of identifier G' of block 978 at block 974, the process will pass to identifier G' and continue therefrom.

Once the process enters block 978 it moves directly to block 980. Here the last values of a, e, p, LEN, LOCATION, SCORE and the entire best sub-string table are popped off of the stack. Thus, the comparison process is effectively reset so that the process can continue to perform other comparisons starting with the previously saved comparison results. Then the process moves to block 982 and continues therefrom as described above. It will be readily appreciated that the overall effect of the operations of blocks 968–984 is to evaluate all possible lexicon sub-string combinations for the remaining lexicon sub-string positions of the selected composite lexicon character string based on each entry in the best sub-string table. When the sub-string length counter LEN finally becomes greater than the predetermined maximum value and the process enters block 984, the process essentially terminates for this lexicon sub-string position as the process exits process portion 950 and reenters process portion 840 via identifier H' at block 986.

With reference now to FIG. 7F, the comparison operation of block 960 (FIG. 7E) will be described in greater detail. As described above, the comparison operations of blocks 996, 1008, and 1022 shown in FIG. 7F will be described in even greater detail below.

Turning now to FIG. 7F, the comparison operation of block 960 is shown as process portion 990. The operation begins at identifier C' of block 958 and then moves to block 996 via identifier E' of block 994. Here, the process compares the unmodified selected lexicon sub-string with the unmodified phantom character table data beginning at position p. Further, a lexicon sub-string sub-score is generated and associated with the lexicon sub-string. Next, the process continues to block 1000 via identifier F' of block 998. Here, a determination is made whether the lexicon sub-string sub-score is the best score for this length lexicon sub-string. If so, the sub-score and its associated lexicon sub-string is saved in the best sub-string table at block 1002. Otherwise, the lexicon sub-string and its associated sub-score are disposed of at block 1004. Regardless, the process then enters block 1006 where one of the lexicon character sub-string positions is masked. The process then enters block 1008, via identifier E' of block 994, where the modified lexicon sub-string is compared with the phantom character table data in the same manner as the comparison operation of block 996 above. Next, the process continues to block 1010, via identifier F' of block 998, where it is determined whether the lexicon sub-string sub-score is the best score for this length lexicon sub-string. If so, the sub-score and its associated modified lexicon sub-string is saved in the best sub-string table at block 1012. Otherwise, the modified lexicon sub-string and its associated sub-score are disposed of at block 1014. Regardless, of the determination of block 1010, however, the process then enters block 1016 where a determination is made whether the last position of the lexicon sub-string has been masked. If not, the process passes up to block 1018 where the previously masked position is unmasked and where a different lexicon sub-string position is masked. Thereafter, the process returns to block 1008, via identifier E' of block 994, and the newly modified lexicon sub-string is evaluated according to the operations of blocks 1008 through 1016. Those of ordinary skill will understand that the process will repeat as described above until the last lexicon sub-string position has been masked. When this occurs and the process enters block 1016, the process moves to block 1020. Here, the lexicon sub-string is unmasked and one position of the phantom character data table is masked. The process then moves to block 1022, via identifier E' of block 994, where the unmodified lexicon sub-string is compared with the modified phantom character data table in the same manner as the comparison operation of blocks 996 and 1008 as described above.

Next, the process continues to block 1024, via identifier F' of block 998, where it is determined whether the lexicon sub-string sub-score is the best score for this length lexicon sub-string. If so, the sub-score and its associated modified lexicon sub-string are saved in the best sub-string table at block 1026. Otherwise the unmodified lexicon sub-string and its associated sub-score are disposed of at block 1028. Regardless, of the determination of block 1024, however, the process then enters block 1030 where a determination is made whether the last phantom character data table position was masked. If not, the process passes up to block 1032 where a different phantom character data table position is masked. Thereafter, the process returns to block 1022, via identifier E of block 994, and the unmodified lexicon sub-string is compared with the newly modified phantom character data table according to the operations of blocks 1022 through 1030. When the last phantom character data table position has been masked and the process enters block 1030, the process reenters process portion 950 (FIG. 7E) via identifier D at block 962. At this point, the now completed comparison operation results in the generation of a completed best sub-string table for one of the lexicon sub-strings. Upon return to process portion 950 the remaining lexicon sub-strings will be evaluated in the same manner as described above until the best sub-string table contains the best entries of all of the lexicon sub-strings.

Referring now to FIG. 7G, the lexicon character sub-string/phantom character table data comparison operation of blocks 996, 1008 and 1022 will now be described in greater detail. As indicated by the use of identical reference numerals and identifiers, the operations of these blocks are preferably substantially identical to one another. The comparison operation of these blocks is shown as process portion 1090 in FIG. 7G. This process portion begins with identifier E' at block 994 and passes directly to block 1094 where an altered lexicon sub-string is initialized to a blank string. The altered lexicon sub-string will serve as a temporary storage location for the decoded lexicon sub-strings as they are evaluated. As the lexicon sub-string is completed on a character by character basis, it may differ from the lexicon sub-string itself insofar as a space, actually in the lexicon sub-string, may be omitted from the altered lexicon sub-string. Thus, this portion of the process differs slightly from other aspects of the present invention in that, it may be an altered lexicon sub-string, not the lexicon sub-string itself, which will be finally outputted. Otherwise, the altered lexicon sub-string is treated in substantially the same manner as the lexicon sub-strings described above.

Once the altered lexicon sub-string is initialized, the process passes to block 1096 where the altered lexicon sub-string is associated with a sub-score which has been initialized to the highest possible value. Additionally, the first positions of both (1) the previously selected lexicon sub-string; and (2) the phantom character data table are selected. The process then moves to block 1098 where a determination is made whether the end of the lexicon sub-string has been reached. If so, the process exits process portion 1090 via identifier F' at block 998. Thus, the process reenters the larger process portion 990 at one of blocks 1000, 1008 or 1022 and continues therefrom. Otherwise, the process moves to block 1102 where it is determined whether the end of the phantom character data table has been reached. If so, the process moves to block 1104 where the lexicon sub-string sub-score is assigned the worst possible value and the process passes back to larger process 990 by identifier F' at block 998. If not, the process drops to block 1106. Here, the data in the currently selected position of the phantom character data table is tested to see if it is a space. If so, the process moves to block 1108 where a determination is made whether the currently selected lexicon sub-string character is also a space. If so, the phantom character and lexicon sub-string character match and the process descends to block 1126. If not, the process again moves to block 1104 where the lexicon sub-string is assigned a sub-score of the worst possible value and the process re-enters larger process portion 990 via identifier F' of block 998.

If the data in the currently selected position of the phantom character data table is not a space, the process passes to block 1110 where a determination is made whether the currently selected lexicon sub-string character is an alphabetic character. If so, the process moves to block 1112 where the lexicon sub-string character is compared with the alphabetic portion of the phantom character table data. From here, the process descends to block 1124. If the current lexicon sub-string character is not alphabetic, the process will move to block 1114 where a determination is made whether the current lexicon sub-string character is numeric. If so, the process moves to block 1116 where the current lexicon sub-string character is compared with the numeric portion of the phantom character table data. Once again, the process will then pass down to block 1124 and continue therefrom. If the current lexicon sub-string character is not numeric, the process moves to block 1118 where a determination is made whether the current lexicon sub-string character is a space. If not, the process continues to block 1120 where the lexicon sub-string character is compared with the alphanumeric portion of the phantom character table data. It will be recalled that this portion of the phantom character data table was generated by the recognition engine while neither a numeric nor alphabetic constraint was placed on the output of the recognition engine. Thus, special characters, such as punctuation, could possibly be matched at block 1120.

Regardless of whether blocks 1112, 1116, or 1120 were executed, however, the process moves to block 1124 where either the phantom character or default confidence values are mathematically combined with the confidence values previously saved for earlier characters of this lexicon sub-string. The phantom character and default confidence values are preferably decimals greater than zero and less than or equal to one. The preferred method of combination is multiplication. Then the process passes to block 1126 where the current lexicon sub-string character is appended to altered lexicon character sub-string. The process then moves up to block 1122. The process will also pass to block 1122 if, in block 1118, it is determined that the lexicon sub-string character is a space. Once process portion 1090 enters block 1122, another position of the lexicon sub-string and another position of the phantom character data table are selected. The process returns to block 1098 and continues as described above. It will be readily appreciated that when either (1) the end of the lexicon sub-string; or (2) the end of the phantom character table is reached, process portion 1090 will essentially terminate for this lexicon sub-string as the process re-enters to the larger process 990 via identifier F' at block 998.

Figure 7H:
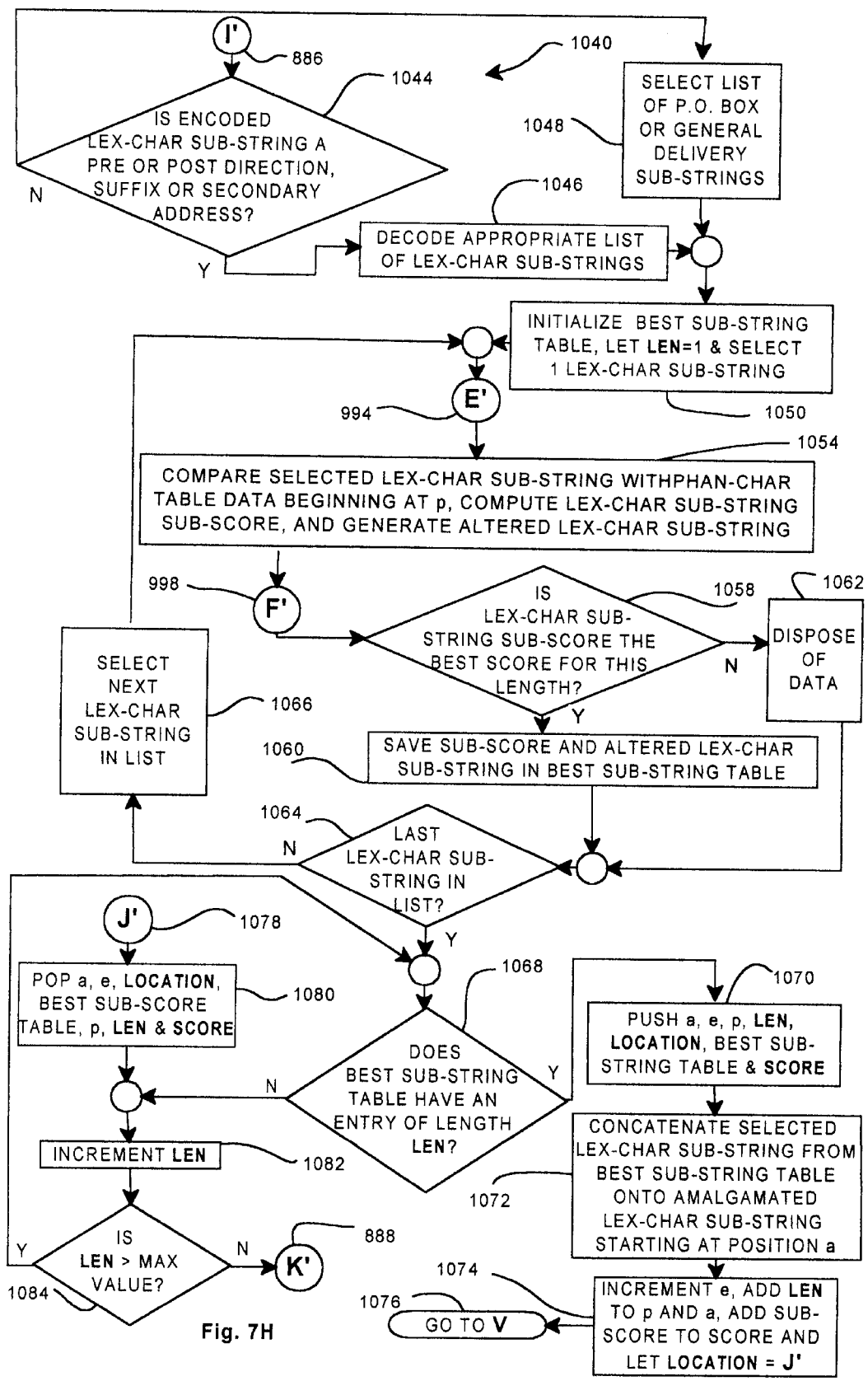

With reference now to FIG. 7H, the operation of block 887 (FIG. 7B) will now be described in greater detail. While execution of the operation of block 887 is fully described in process portion 1040 (FIG. 7H), the operation of block 1054 shown therein is substantially identical to detailed process portion 1090 of FIG. 7G.

Referring now to FIG. 7H, the match other sub-string type operation of block 887 begins with identifier I' at block 886. Overall process 800 enters process portion 1040 with values of p, e, a, SCORE, BEST MATCH SCORE having been assigned and with a previously selected composite lexicon character string. Thus, the process continues directly to block 1044 where a determination is made whether the encoded lexicon sub-string represents any one of (1) a predirection; (2) a post direction; (3) a suffix; or (4) a secondary address. If so, the process enters block 1046 where the appropriate list of lexicon sub-strings is decoded. Otherwise, the process passes to block 1048 where the appropriate list of either P.O. Box or general delivery sub-strings is selected. In any event, the process then continues to block 1050 where the best sub-string table is initialized as a blank table and the best sub-string table position counter LEN is initialized to a value of one.

Additionally, one lexicon sub-string is selected from the list of decoded lexicon sub-strings.

Next, the process passes to block 1054 via identifier E' at block 994. Here, the process compares the selected lexicon sub-string with the phantom character table data beginning at position p. Further, a lexicon sub-string sub-score is generated and associated with the selected lexicon sub-string. Finally, if necessary, a space may be removed from the lexicon sub-string if the corresponding position in the phantom character data table does not contain a space. As indicated by the use of identical reference numerals and identifiers, this process is substantially identical to process portion 1090 of FIG. 7G.

Next, the process continues to block 1058 via identifier F' of block 998, where it is determined whether the lexicon sub-string sub-score is the best score for this length lexicon sub-string. If so, the sub-score and its associated lexicon sub-strings are saved in the best sub-string table at block 1050. Otherwise, the lexicon sub-string and its associated sub-score are disposed of at block 1062. Regardless, of the determination of block 1058, however, the process then enters block 1064 where a determination is made whether the lexicon sub-string just evaluated is the last lexicon sub-string in the list of lexicon sub-strings. If not, the process passes up to block 1066 where a different lexicon sub-string is selected. Thereafter, the process returns to block 1054, via identifier E' of block 994, and the newly selected lexicon sub-string is evaluated according to the operations of blocks 1054 through 1064. Those of ordinary skill will understand that the process will repeat as described above until the last lexicon sub-string has been selected. When this occurs, and the process encounters block 1064, the process moves to block 1068. At block 1068 it is determined whether the best sub-string table has any entries of length LEN. If not, the process moves to block 1082 where the value of LEN is incremented. Next, the process moves to block 1084 where LEN is tested to ensure that it is not greater than some predetermined maximum value. This maximum value will preferably be determined by the specific sub-string type (e.g., pre or post direction) as described in the U.S.P.S. "Technical Guide". If LEN is greater than the maximum value the process passes back to process portion 840 (FIG. 7B) via identifier K' at block 888 and continues therefrom. Otherwise, the process returns to block 1068 and continues therefrom.

If on the other hand, the results of the determination made in block 1068 is in the affirmative, the process passes to block 1070. Here, the values of a, e, p, LEN, LOCATION, SCORE and the entire best sub-string table are saved into memory by pushing them onto a stack. Additionally, the lexicon sub-string of length LEN is selected from the best sub-string table. The process then moves to block 1072 where the selected lexicon sub-string is concatenated onto with whatever may presently exists of an amalgamated composite lexicon string beginning at position a. Next, the process moves to block 1074 where the following occurs: (1) the value of e is incremented; (2) the value of LEN is added to both p and a; (3) the sub-score associated with the selected lexicon sub-string is combined with variable SCORE; and (4) the value of LOCATION is set to identifier J'. It will be readily appreciated that the effect of the operations of blocks 1068–1074 is to save the accumulated comparison results generated thus far for the selected lexicon character string.

The process then moves to block 1076 where it passes to identifier V at block 846 (FIG. 7B) and continues on therefrom. In essence, then, the process will continue to evaluate the remainder of the lexicon sub-strings of the selected composite lexicon character string, if any, based on the values saved in block 1070. Until all of the possibilities have been exhausted. When this occurs the process will eventually arrive at one of blocks 850, 864 or 889 where the process will pass to the present value of variable LOCATION. Since LOCATION was previously assigned a value of identifier J' of block 1078 in block 1074, the process will pass to identifier J' at block 1078 and continue therefrom.

Once the process enters block 1078 it moves directly to block 1080. Here the last values of a, e, p, LEN, LOCATION, SCORE and the entire best sub-string table are popped off of the stack. Thus, the comparison is effectively reset so that the process can continue to perform other comparisons starting with the previously saved comparison results. Then the process moves to block 1082 and continues therefrom as described above. It will be readily appreciated that the overall effect of the operations of blocks 1068–1084 is to evaluate all possible lexicon sub-string combinations for the remaining lexicon sub-string positions of the selected composite lexicon character string based on each entry in the best sub-string table. When the sub-string length counter LEN finally becomes greater than the predetermined maximum value and the process enters block 1084, the process essentially terminates for this lexicon sub-string position as the process exits process portion 1040 and re-enters process portion 840 via identifier K' at block 888.

While the present invention has been described in connection what is presently considered to be the most practical and preferred embodiments, it is to be understood that the invention is not limited the disclosed embodiment, but is intended to cover various modifications and equivalent arrangements included within the spirit and scope of the appended claims.

What is claimed is:

1. For use with a document processing system having an optical character recognition device for scanning documents with one or more discrete alphanumeric characters collectively forming an alphanumeric character string contained in a field having a number of character positions, the document processing system also having a memory with a lexicon of character strings wherein at least a portion of all of the possible alphanumeric character strings are listed in the lexicon as lexicon strings, the document processing system also having a recognition engine for generating at least one phantom character data table consisting of a set of cognate pairs of phantom characters and associated confidence values for each position of the field, a method of selecting the lexicon string which most accurately represents an alphanumeric character string contained within the field, said method comprising the steps of:

receiving at least one phantom character data table from the recognition engine;

generating a numeric value for each of at least some of the lexicon strings, wherein each numeric value relates to the probability that its associated lexicon string accurately represents the alphanumeric character string contained within the field, and wherein each numeric value results from mathematical combination of the confidence values associated with each phantom character which matches a lexicon character within a predetermined number of positions of the corresponding position of the lexicon string, if none of the phantom characters received for a given position of the alphanumeric character string matches a lexicon character within the predetermined number of positions of the corresponding position of the lexicon string, a predetermined default confidence value is substituted for the phantom character confidence value in the mathematical combinations;

comparing the resulting numeric values generated for each lexicon string; and selecting the lexicon string having a resulting associated numeric value indicating that the selected lexicon string most accurately represents the alphanumeric character string contained within the field.

2. For use with a document processing system having an optical character recognition device for scanning documents with one or more discrete alphanumeric characters collectively forming an alphanumeric character string contained in a field having a number of character positions, the document processing system also having a memory with a lexicon of character strings wherein at least a portion of all of the possible alphanumeric character strings are listed in the lexicon as lexicon strings, the document processing system also having a recognition engine for generating at least one phantom character data table consisting of a set of cognate pairs of phantom characters and associated confidence values for each position of the field, wherein the lexicon character strings listed in the lexicon have associated frequency values, each frequency value relating to the frequency with which its associated lexicon character string is actually utilized when compared with the set of all possible alphanumeric character strings, a method of selecting the lexicon string which most accurately represents an alphanumeric character string contained within the field, said method comprising the steps of:

receiving at least one phantom character data table from the recognition engine;

generating a numeric value for each of at least some of the lexicon strings, wherein each numeric value relates to the probability that its associated lexicon string accurately represents the alphanumeric character string contained within the field, and wherein each numeric value results from mathematical combination of the confidence values associated with each phantom character which matches a lexicon character within a predetermined number of positions of the corresponding position of the lexicon string and the frequency value associated with each lexicon string, if none of the phantom characters received for a given position of the alphanumeric character string matches a lexicon character within the predetermined number of positions of the corresponding position of the lexicon string, a predetermined default confidence value is substituted for the phantom character confidence value in the mathematical combination;

comparing the resulting numeric values generated for each lexicon string; and selecting the lexicon string having a resulting associated numeric value indicating that the selected lexicon string most accurately represents the alphanumeric character string contained within the field.

3. A method of selecting the lexicon string which most accurately represents an alphanumeric character string contained within a field as recited in claim 1, further comprising the step of:

modifying the phantom character data table by replacing the phantom character data from at least one position of said phantom character data table with all possible alphanumeric character values and at least one predetermined default confidence value.

4. A method of selecting the lexicon string which most accurately represents an alphanumeric character string contained within a field as recited in claim 1, further comprising the step of:

modifying the phantom character data table to include at least one additional phantom character data table position.

5. A method of selecting the lexicon string which most accurately represents an alphanumeric character string contained within a field as recited in claim 4, wherein the data contained within the additional positions of the phantom character data table consists of a dummy character and a predetermined associated default confidence value.

6. A method of selecting the lexicon string which most accurately represents an alphanumeric character string contained within a field as recited in claim 4, wherein the data contained within the additional positions of the phantom character data table consists of all possible alphanumeric character values and at least one predetermined associated default confidence value.

7. A method of selecting the lexicon character string which most accurately represents an alphanumeric character string contained within a field as recited in claim 1, further comprising the steps of:

generating a distance value relating to the probability that the selected lexicon string accurately represents the alphanumeric character string contained within the field; and outputting the selected lexicon character string if the distance value is one of above or below a predetermined threshold value and transmitting a signal indicating indeterminate results if the distance value is the other of above or below the threshold value.

8. A method of selecting the lexicon character string which most accurately represents an alphanumeric character string contained within a field as recited in claim 7, wherein the numeric values of said step of generating a numeric value result from mathematical combination of the confidence values associated with each phantom character which matches the lexicon character in the corresponding position of the lexicon string and the frequency value associated with each lexicon string, if none of the phantom characters received for a given position of the alphanumeric character string matches the character in the corresponding position of the lexicon character string, a predetermined default confidence value is substituted for the phantom character confidence value in said mathematical combination.

9. A method of selecting the lexicon string which most accurately represents an alphanumeric character string contained within a field as recited in claim 1, wherein said step of generating a numeric value comprises:

generating a numeric value for each lexicon string having the same number of character positions as the phantom character data table if either, at least one of the phantom characters in the first position of the phantom character data table matches the lexicon character in the corresponding position of the lexicon string, or at least one of the phantom characters in the second position of the phantom character data table matches the character lexicon in the corresponding position of the lexicon string, generating a plurality of numeric values for each lexicon string having at least one more character position than the phantom character data table, each of said numeric values being generated while at least one position of each lexicon string is masked; and generating a plurality of numeric values for each lexicon string having at least one less character position than the phantom character data table if either, at least one of the phantom characters in the first position of the phantom character data table matches the lexicon character in the corresponding position of the lexicon string, or at least one of the phantom characters in the second position of the phantom character data table matches the character in the corresponding position of the lexicon string, each of the numeric values being generated while at least one character position of the phantom character data table is masked.

10. A method of selecting the lexicon character string which most accurately represents an alphanumeric character string contained within a field as recited in claim 1, wherein the predetermined number positions of said step of generating a numeric value equals one position, and wherein the numeric values result from mathematical combinations of the phantom character confidence values and the default confidence values selected using a recursive trinary-tree matching algorithm.

11. A method of selecting the lexicon string which most accurately represents an alphanumeric character string contained within a field as recited in claim 1, wherein the numerical values of said step of generating a numeric value result from mathematical combination of the phantom character confidence values and the default confidence values and the default confidence values selected using a recursive trinary tree matching algorithm.

12. A method of selecting the lexicon string which most accurately represents an alphanumeric character string contained within a field as recited in claim 11, wherein the predetermined number of positions of said step of generating a numerical value equals one position.

13. For use with a document processing system having an optical character recognition device for scanning documents with a composite alphanumeric character string contained in a composite field consisting of at least two related sub-fields wherein each sub-field has a number of character positions, the document processing system also having a memory with a lexicon of composite lexicon strings, each composite lexicon string consisting of at least two lexicon sub-strings, wherein at least a portion of all possible alphanumeric character strings for at least one sub-field can be listed in the lexicon, the document processing system also having a recognition engine for generating at least one phantom character data table for each sub-field of the composite field, each data table consisting of a set of cognate pairs of phantom characters with associated confidence values for each position of the sub-field, a method of selecting the composite lexicon string which most accurately represents a composite alphanumeric character string contained within the composite field, said method comprising the steps of:

receiving a first phantom character data table from the recognition engine for the first sub-field of the composite field;

generating a set of first phantom character sub-strings from the data in the first data table, said first phantom character sub-strings possibly accurately representing the alphanumeric character sub-string contained within the first sub-field of the composite field;

generating a first numeric value for each of at least some of the first phantom character sub-strings, wherein each of the first numeric values relates to the probability that its associated phantom character sub-string accurately represents the alphanumeric character sub-string contained within the first sub-field;

receiving at least one phantom character data table from the recognition engine for each of the other sub-fields;

generating additional numeric values for at least some of the lexicon sub-strings of each of the other sub-fields from at least some of the composite lexicon strings having a first sub-string which matches one of the phantom character sub-strings for the first sub-field, wherein each additional numeric value relates to the probability that its associated lexicon sub-string accurately represents the alphanumeric character sub-string contained within one of the other sub-fields;

generating a composite numeric value for each of at least some of the composite lexicon strings, wherein each composite numeric value relates to the probability that its associated composite lexicon string accurately represents the composite alphanumeric character string contained within the composite field;

comparing the composite numeric values generated for each composite lexicon string; and selecting the composite lexicon string having an associated composite numeric value indicating that the selected composite lexicon string most accurately represents the composite alphanumeric character string contained within the composite field.

14. A method of selecting the composite lexicon string which most accurately represents a composite alphanumeric character string contained within a composite field as recited in claim 13, wherein said step of generating a set of first phantom character sub-strings comprises:

generating a first set of derivative data tables, the first set of derivative data tables consisting of the phantom character table data of the first data table if the number of positions in the first data table equals some predetermined value, a plurality of first derivative data tables created by masking at least one position of the first data table if the number of positions in the data table is greater than the predetermined value, and at least one first derivative data table created by inserting dummy characters and at least one default confidence value into at least one position of the first data table if the number of positions in the first data table is less than the predetermined value;

generating a plurality of phantom character sub-strings for the first sub-field from the first set of derivative phantom character data tables.

15. A method of selecting the composite lexicon string which most accurately represents a composite alphanumeric character string contained within a composite field as recited in claim 14, wherein said step of generating a plurality of phantom character sub-strings comprises:

generating all possible phantom character sub-strings which can be created from the first set of derivative phantom character data tables, wherein the phantom character sub-strings are generated while the data in each position of each derivative data table is replaced with all possible character values and at least one default confidence value, one position at a time.

16. A method of selecting the composite lexicon character string which most accurately represents a composite alphanumeric character string contained within a composite field as recited in claim 13, wherein said step of generating additional numeric values includes the step of:

generating an additional set of derivative data tables for each of at least one of the other sub-fields, at least one of the additional sets of phantom character data tables comprising, the additional data table if the number of positions in the additional data table is equal to some predetermined value, a plurality of additional derivative data tables created by masking at least one position of the additional data table if the number of positions in the additional data table is greater than the predetermined value, and at least one additional derivative data table created by inserting dummy characters and at least one associated default confidence value into each of at least one position of the additional data table if the number of positions in the additional data table is less than the predetermined value.

17. A method of selecting the composite lexicon character string which most accurately represents a composite alphanumeric character string contained within a composite field as recited in claim 16, wherein said step of generating additional numeric values includes the step of generating a set of all possible additional phantom character sub-strings which can be created from each of at least one additional set of derivative data tables, wherein a plurality of phantom character sub-strings are generated while the data in each position of each additional derivative data table is individually replaced with all possible character values and at least one default confidence value, and wherein the additional numeric values of said step of generating additional numeric values result from mathematical combination of the confidence values associated with each phantom character in a given position of one of the derivative data tables which matches the lexicon character in the corresponding position of the corresponding lexicon sub-string, if none of the phantom characters in a given position of one of the derivative data tables matches the character in the corresponding position of the corresponding lexicon sub-string, a predetermined default confidence value is substituted for the phantom character confidence value in said mathematical combination.

18. A method of selecting the composite lexicon character string which most accurately represents a composite alphanumeric character string contained within a composite field as recited in claim 14, wherein at least one of the additional sets of data tables consists of, a dummy character data table if the number of positions in the additional data table is above or below a predetermined reference number by some predetermined range value.

19. A method of selecting the composite lexicon character string which most accurately represents a composite alphanumeric character string contained within a composite field as recited in claim 14, wherein the numeric values of said step of generating a first numeric value result from mathematical combination of the phantom character values and the default confidence values selected using a recursive trinary-tree matching algorithm.

20. A method of selecting the composite lexicon character string which most accurately represents a composite alphanumeric character string contained within a composite field as recited in claim 14, wherein said additional numeric values result form mathematical combination of the confidence values associated with each phantom character in a given position of one of the other data tables which matches a lexicon character within one position of the corresponding position of the corresponding lexicon sub-string, if none of the phantom characters in a given position of the phantom character data table matches a lexicon character within one position of the corresponding position of the corresponding lexicon sub-string, a predetermined default confidence value is substituted for the phantom character confidence value in said mathematical combination, and wherein the numeric values of said step of generating numeric values result from mathematical combination of the phantom character confidence values and the default confidence values selected using a recursive trinary-tree matching algorithm.

21. A method of selecting the composite lexicon character string which most accurately represents a composite alphanumeric character string contained in a composite field as recited in claim 14, further comprising the steps of:

generating a distance value relating to the probability that the selected composite lexicon string accurately represents the composite alphanumeric character string contained within the composite field; and outputting the selected composite lexicon character string if the distance value is one of above or below a predetermined threshold value and transmitting a signal indicating indeterminate results if the distance value is the other of above or below the threshold value.

22. A method of selecting the composite lexicon character string which most accurately represents a composite alphanumeric character string contained within a composite field as recited in claim 13, wherein the lexicon sub-strings of at least one of the sub-fields have associated frequency values, each frequency value relating to the frequency with which its associated lexicon character sub-string is actually utilized when compared with the set of all possible alphanumeric character sub-strings, and wherein each of the composite numeric values of said step of generating composite numeric values results from mathematical combination of the first numeric value, the additional numeric values associated with each selected lexicon sub-string of at least one of the other sub-fields, and the frequency values associated with each lexicon sub-string of at least one of the other sub-fields.

23. For use with a document processing system having an optical character recognition device for scanning documents with a composite alphanumeric character string contained in a composite field consisting of at least two related sub-fields wherein each sub-field has a number of character positions, the document processing system also having a memory with a lexicon of composite lexicon strings, each composite lexicon string consisting of at least two lexicon sub-strings contained within at least two lexicon sub-fields of the composite lexicon field, at least some of the composite lexicon strings including a plurality of alternative lexicon sub-strings for a single lexicon sub-field, wherein at least a portion of all possible alphanumeric character strings can be listed in the lexicon, a method of selecting an amalgamated composite lexicon string which most accurately represents a composite alphanumeric character string contained within the composite field, said method comprising the steps of:

generating a numeric value for at least one of the lexicon sub-strings from each lexicon sub-field of at least some of the composite lexicon strings, wherein each of the numeric values relates to the probability that its associated lexicon sub-string accurately represents the alphanumeric character sub-string contained within one of the alphanumeric character string sub-fields;

generating an amalgamated composite lexicon string for each of at least some of the composite lexicon strings by collecting the lexicon sub-strings of each of the lexicon sub-fields having a numeric value indicating that its associated lexicon sub-string most accurately represents the alphanumeric character sub-string for one lexicon sub-field;

generating a composite numeric value for each of at least some of the amalgamated composite lexicon strings, wherein each composite numeric value relates to the probability that its associated amalgamated composite lexicon string accurately represents the composite alphanumeric character string contained within the composite field;

comparing the composite numeric values generated for each amalgamated composite lexicon string; and selecting the amalgamated composite lexicon string having an associated composite numeric value indicting that the selected amalgamated composite lexicon string most accurately represents the composite alphanumeric character string contained within the composite alphanumeric character string field.

24. A method of selecting an amalgamated composite lexicon string which most accurately represents a composite alphanumeric character string contained within a composite field, as recited in claim 23, wherein the document processing system also has as recognition engine for generating at least one phantom character data table for each sub-field of the composite field, each data table consisting of a set of cognate pairs of phantom characters and associated confidence values for each position of the alphanumeric character string field;

wherein said method further comprises the step of receiving at least one phantom character data table from the recognition engine; and wherein the numeric values from said step of generating a numeric value results from mathematical combination of the confidence values associated with each phantom character which matches a lexicon character within a predetermined number of positions of the corresponding position of the lexicon sub-string if none of the phantom characters received for a given position of the alphanumeric character string matches a lexicon character within the predetermined number of positions of the corresponding position of the lexicon string, a predetermined default confidence value is substituted for the phantom character confidence value in the mathematical combination.

25. A method of selecting an amalgamated composite lexicon string which most accurately represents a composite alphanumeric character string contained within a composite field, as recited in claim 24, wherein at least some of the phantom character data tables generated by the recognition engine consist of a numeric part, an alphabetic part and an alphanumeric part;

wherein said step of generating a numeric value further comprises the step of determining whether each lexicon character is numeric, alphabetic, or alphanumeric; and wherein said step of receiving at least one phantom character data table comprises, receiving the part of at least one phantom character data table which is of the same type as each lexicon character.

26. A method of selecting an amalgamated composite lexicon string which most accurately represents a composite alphanumeric character string contained within a composite field, as recited in claim 24, further comprising the step of:

modifying at least one of the phantom character data tables by replacing the phantom character data from at least one position of said phantom character data table with all possible alphanumeric character values and at least one predetermined default confidence value.

27. A method of selecting an amalgamated composite lexicon string which most accurately represents a composite alphanumeric character string contained within a composite field, as recited in claim 24, further comprising the step of modifying at least one of the phantom character data tables to include at least one additional phantom character data table position, wherein the data contained within the additional positions of the data table consists of a dummy character and a predetermined associated default confidence value.

28. A method of selecting an amalgamated composite lexicon string which most accurately represents a composite alphanumeric character string contained within a composite field, as recited in claim 24, wherein the numeric values of said step of generating numeric values result from mathematical combination of the phantom character confidence values and the default confidence values selected using a recursive trinary tree matching algorithm.

29. A method of selecting an amalgamated composite lexicon string which most accurately represents a composite alphanumeric character string contained within a composite field as recited in claim 24, further comprising the steps of:

generating a distance value relating to the probability that the selected amalgamated composite lexicon string accurately represents the composite alphanumeric character string contained within the composite field; and outputting the selected amalgamated composite lexicon character string if the distance value is one of above or below a predetermined threshold value and transmitting a signal indicating indeterminate results if the distance value is the other of above or below the threshold value.

30. A method of selecting an amalgamated composite lexicon character string which most accurately represents a composite alphanumeric character string contained within a composite field as recited in claim 24, wherein the lexicon sub-strings of at least one of the sub-fields have associated frequency values, each frequency value relating to the frequency with which its associated lexicon character sub-string is actually utilized when compared with the set of all possible alphanumeric character sub-strings; and wherein each of the composite numeric values of said step of generating composite numeric values results from mathematical combination of the numeric values associated with each selected lexicon sub-string and the frequency values associated with each selected lexicon sub-string.

31. For use with a document processing system having an optical character recognition device for scanning documents with one or more discrete alphanumeric characters collectively forming an alphanumeric character string contained in a field having a number of character positions, the document processing system also having a memory with a predetermined and static lexicon of character strings wherein at least a portion of all of the possible alphanumeric character strings are listed in the static lexicon as lexicon strings, a method of selecting the lexicon string which most accurately represents an alphanumeric character string contained within the field, said method comprising the steps of:

generating a numeric value for each of at least some of the lexicon strings, wherein each numeric value relates to the probability that its associated lexicon string accurately represents the alphanumeric character string contained within the field;

comparing the resulting numeric values generated for each lexicon string; and selecting the lexicon string having a resulting associated numeric value indicating that the selected lexicon string most accurately represents the alphanumeric character string contained within the field.

* * * * *